(12) United States Patent
Hamberger

(10) Patent No.: US 9,121,181 B2
(45) Date of Patent: Sep. 1, 2015

(54) CONNECTION FOR ELASTIC OR PANEL-TYPE COMPONENTS, PROFILED SLIDE, AND FLOOR COVERING

(75) Inventor: Peter M. Hamberger, Stephanskirchen (DE)

(73) Assignee: HAMBERGER INDUSTRIEWERKE GmbH, Stephanskirchen (DE)

( * ) Notice: Subject to any disclaimer, the term of this patent is extended or adjusted under 35 U.S.C. 154(b) by 0 days.

(21) Appl. No.: 14/235,825

(22) PCT Filed: Jul. 30, 2012

(86) PCT No.: PCT/EP2012/064905
§ 371 (c)(1),
(2), (4) Date: May 13, 2014

(87) PCT Pub. No.: WO2013/017574
PCT Pub. Date: Feb. 7, 2013

(65) Prior Publication Data
US 2014/0290173 A1  Oct. 2, 2014

(30) Foreign Application Priority Data

Jul. 29, 2011 (DE) .......................... 10 2011 052 300
Aug. 1, 2011 (DE) .......................... 10 2011 052 342
Sep. 5, 2011 (DE) .......................... 10 2011 053 283
Oct. 27, 2011 (DE) .......................... 10 2011 054 860
Dec. 7, 2011 (DE) .......................... 10 2011 056 146
Dec. 28, 2011 (DE) .......................... 10 2011 057 098
Mar. 20, 2012 (DE) .......................... 10 2012 102 339

(51) Int. Cl.
*E04B 2/00* (2006.01)
*E04F 15/02* (2006.01)
(Continued)

(52) U.S. Cl.
CPC ....... *E04F 15/02038* (2013.01); *E04F 13/0894* (2013.01); *F16B 5/0016* (2013.01);
(Continued)

(58) Field of Classification Search
CPC ............ E04C 2/40; E04F 15/10; E04F 15/04; E04F 2201/0138; E04F 2201/0523
USPC ........... 52/390, 392, 533, 534, 539, 553, 578, 52/582.1, 586.1, 586.2, 588.1, 589.1, 52/590.2, 590.3, 591.1, 591.2, 591.3, 52/591.4, 591.5, 592.1, 592.2, 592.4
See application file for complete search history.

(56) References Cited

U.S. PATENT DOCUMENTS 87,853 A * 3/1869 Kappes ........................ 52/592.1
108,068 A * 10/1870 Utley .......................... 52/591.4
(Continued)

FOREIGN PATENT DOCUMENTS

DE           199 62 830 C2     7/2002
DE       10 2005 002 297 A1    8/2005
(Continued)

OTHER PUBLICATIONS

International Preliminary Report on Patentability issued in International Application No. PCT/EP2012/064905 dated Feb. 4, 2014.
(Continued)

*Primary Examiner* — Mark Wendell
(74) *Attorney, Agent, or Firm* — Oliff PLC

(57) ABSTRACT

A locking element is arranged on one component, the locking element being bringable into locking engagement with a locking recess on the other component for the purpose of a vertical lock. The locking element is provided with functional elements, via which the components are substantially horizontally and vertically locked. The locking element can be designed as a profiled slide that has a locking projection with a first guiding surface which is positioned angularly with respect to the installation plane and which comes into contact with a locking surface or another circumferential section of the locking recess during the connecting process such that a force component that causes a movement from a release position into a locked position is applied to the profiled slide.

29 Claims, 18 Drawing Sheets

Figure 1:
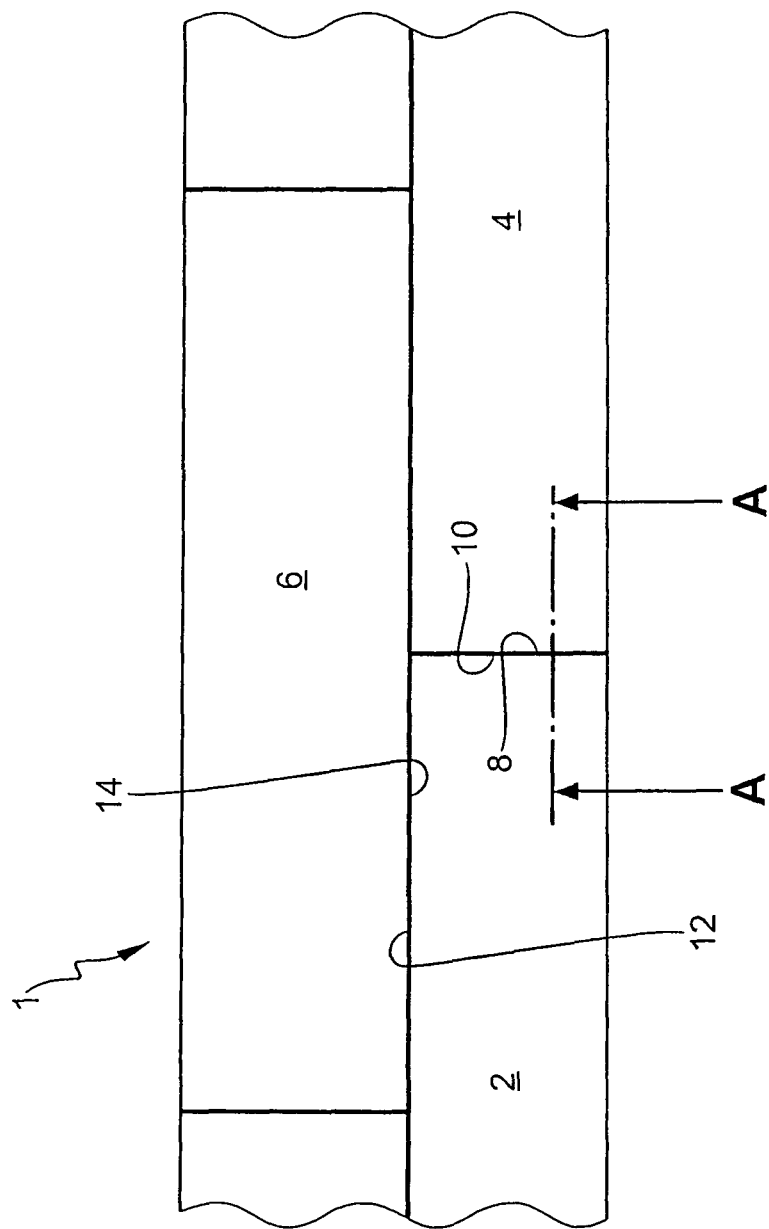

(51) Int. Cl.
*E04F 13/08* (2006.01)
*F16B 5/00* (2006.01)

(52) U.S. Cl.
CPC . *E04F2201/0146* (2013.01); *E04F 2201/0153* (2013.01); *E04F 2201/0176* (2013.01); *E04F 2201/0547* (2013.01)

(56) References Cited

U.S. PATENT DOCUMENTS

| | | | | |
|---|---|---|---|---|
| 124,228 | A * | 3/1872 | Stuart | 280/11.31 |
| 213,740 | A * | 4/1879 | Conner | 52/503 |
| 261,030 | A * | 7/1882 | Orcutt | 12/91 |
| 274,354 | A * | 3/1883 | McCarthy et al. | 52/591.4 |
| 301,775 | A * | 7/1884 | Thompson | 144/228 |
| 316,176 | A * | 4/1885 | Ransom | 190/33 |
| 526,044 | A * | 9/1894 | Merrill | 241/295 |
| 634,581 | A * | 10/1899 | Miller | 403/327 |
| 861,911 | A * | 7/1907 | Stewart | 312/263 |
| 917,352 | A * | 4/1909 | Palmer | 144/137 |
| 1,194,636 | A * | 8/1916 | Joy | 292/163 |
| 1,352,620 | A * | 9/1920 | Onsrud | 144/204 |
| 1,723,306 | A * | 8/1929 | Sipe | 52/396.04 |
| 1,743,492 | A * | 1/1930 | Sipe | 403/297 |
| 1,809,393 | A * | 6/1931 | Rockwell | 52/99 |
| 1,902,716 | A * | 3/1933 | Newton | 52/586.2 |
| 1,911,598 | A * | 5/1933 | Ashum | 408/1 R |
| 2,005,647 | A * | 6/1935 | Crouch | 144/87 |
| 2,026,511 | A * | 12/1935 | Storm | 52/443 |
| 2,054,828 | A * | 9/1936 | Melde | 144/234 |
| 2,204,675 | A * | 6/1940 | Grunert | 52/578 |
| 2,277,758 | A * | 3/1942 | Hawkins | 52/98 |
| 2,430,200 | A * | 11/1947 | Wilson | 52/588.1 |
| 2,571,861 | A * | 10/1951 | Gegumis | 144/36 |
| 2,596,280 | A * | 5/1952 | Nystrom | 52/578 |
| 2,732,706 | A * | 1/1956 | Friedman | 52/586.1 |
| 2,740,167 | A * | 4/1956 | Rowley | 52/591.1 |
| 2,791,247 | A * | 5/1957 | Gerson | 83/425.3 |
| 2,863,185 | A * | 12/1958 | Riedi | 403/297 |
| 2,865,058 | A * | 12/1958 | Andersson et al. | 52/508 |
| 2,876,812 | A * | 3/1959 | Waldron | 144/208.7 |
| 2,889,016 | A * | 6/1959 | Warren | 52/98 |
| 3,023,681 | A * | 3/1962 | Worson | 404/49 |
| 3,077,703 | A * | 2/1963 | Bergstrom | 52/396.04 |
| 3,082,802 | A * | 3/1963 | Dickson et al. | 144/374 |
| 3,099,110 | A * | 7/1963 | Spaight | 52/396.09 |
| 3,147,522 | A * | 9/1964 | Schumm | 24/16 PB |
| 3,271,787 | A * | 9/1966 | Clary | 52/716.2 |
| 3,325,585 | A * | 6/1967 | Brenneman | 52/288.1 |
| 3,378,958 | A * | 4/1968 | Parks et al. | 49/489.1 |
| 3,396,640 | A * | 8/1968 | Fujihara | 404/67 |
| 3,512,324 | A * | 5/1970 | Reed | 52/588.1 |
| 3,517,927 | A * | 6/1970 | Kennel | 482/128 |
| 3,526,071 | A * | 9/1970 | Watanabe | 52/396.06 |
| 3,535,844 | A * | 10/1970 | Glaros | 52/592.1 |
| 3,572,224 | A * | 3/1971 | Perry | 404/40 |
| 3,579,941 | A * | 5/1971 | Tibbals | 52/384 |
| 3,720,027 | A * | 3/1973 | Christensen | 52/309.8 |
| 3,722,379 | A * | 3/1973 | Koester | 404/68 |
| 3,742,669 | A * | 7/1973 | Mansfeld | 52/396.07 |
| 3,760,547 | A * | 9/1973 | Brenneman | 52/586.1 |
| 3,760,548 | A * | 9/1973 | Sauer et al. | 52/592.1 |
| 3,774,660 | A * | 11/1973 | Morey et al. | 144/208.4 |
| 3,778,954 | A * | 12/1973 | Meserole | 52/747.1 |
| 3,817,305 | A * | 6/1974 | Gibbs | 144/231 |
| 3,849,235 | A * | 11/1974 | Gwynne | 428/192 |
| 3,913,642 | A * | 10/1975 | Porter | 144/114.1 |
| 3,919,820 | A * | 11/1975 | Green | 52/396.04 |
| 3,950,915 | A * | 4/1976 | Cole | 52/586.2 |
| 3,986,543 | A * | 10/1976 | Slayton et al. | 144/236 |
| 4,007,994 | A * | 2/1977 | Brown | 404/69 |
| 4,030,852 | A * | 6/1977 | Hein | 404/66 |
| 4,064,571 | A * | 12/1977 | Phipps | 52/716.2 |
| 4,080,086 | A * | 3/1978 | Watson | 404/69 |
| 4,082,129 | A * | 4/1978 | Morelock | 144/368 |
| 4,100,710 | A * | 7/1978 | Kowallik | 52/309.9 |
| 4,107,892 | A * | 8/1978 | Bellem | 52/396.04 |
| 4,113,399 | A * | 9/1978 | Hansen, Sr. | 403/329 |
| 4,151,869 | A * | 5/1979 | Halloran et al. | 144/230 |
| 4,169,688 | A * | 10/1979 | Toshio | 404/40 |
| 4,196,554 | A * | 4/1980 | Anderson et al. | 52/394 |
| 4,227,430 | A * | 10/1980 | Jansson et al. | 81/177.4 |
| 4,299,070 | A * | 11/1981 | Oltmanns et al. | 52/309.11 |
| 4,304,083 | A * | 12/1981 | Anderson | 52/509 |
| 4,426,820 | A * | 1/1984 | Terbrack et al. | 52/590.1 |
| 4,447,172 | A * | 5/1984 | Galbreath | 404/68 |
| 4,512,131 | A * | 4/1985 | Laramore | 52/586.1 |
| 4,599,841 | A * | 7/1986 | Haid | 52/396.04 |
| 4,648,165 | A * | 3/1987 | Whitehorne | 29/225 |
| 5,007,222 | A * | 4/1991 | Raymond | 52/586.1 |
| 5,071,282 | A * | 12/1991 | Brown | 404/68 |
| 5,148,850 | A * | 9/1992 | Urbanick | 160/231.1 |
| 5,173,012 | A * | 12/1992 | Ortwein et al. | 405/302.5 |
| 5,182,892 | A * | 2/1993 | Chase | 52/539 |
| 5,247,773 | A * | 9/1993 | Weir | 52/592.3 |
| 5,272,850 | A * | 12/1993 | Mysliwiec et al. | 52/582.2 |
| 5,344,700 | A * | 9/1994 | McGath et al. | 428/304.4 |
| 5,348,778 | A * | 9/1994 | Knipp et al. | 428/35.8 |
| 5,465,546 | A * | 11/1995 | Buse | 52/480 |
| 5,485,702 | A * | 1/1996 | Sholton | 52/308 |
| 5,548,937 | A * | 8/1996 | Shimonohara | 52/586.1 |
| 5,598,682 | A * | 2/1997 | Haughian | 52/745.21 |
| 5,618,602 | A * | 4/1997 | Nelson | 428/60 |
| 5,634,309 | A * | 6/1997 | Polen | 52/392 |
| 5,658,086 | A * | 8/1997 | Brokaw et al. | 403/327 |
| 5,694,730 | A * | 12/1997 | Del Rincon et al. | 52/586.1 |
| 5,755,068 | A * | 5/1998 | Ormiston | 52/314 |
| 5,899,038 | A * | 5/1999 | Stroppiana | 52/403.1 |
| 5,950,389 | A * | 9/1999 | Porter | 52/586.1 |
| 5,970,675 | A * | 10/1999 | Schray | 52/582.1 |
| 6,006,486 | A * | 12/1999 | Moriau et al. | 52/589.1 |
| 6,029,416 | A * | 2/2000 | Andersson | 52/592.1 |
| 6,052,960 | A * | 4/2000 | Yonemura | 52/393 |
| 6,065,262 | A * | 5/2000 | Motta | 52/582.1 |
| 6,164,349 | A * | 12/2000 | Hsieh | 144/3.1 |
| 6,164,351 | A * | 12/2000 | Weathers | 144/371 |
| 6,173,548 | B1 * | 1/2001 | Hamar et al. | 52/582.1 |
| 6,182,410 | B1 * | 2/2001 | Pervan | 52/403.1 |
| 6,216,409 | B1 * | 4/2001 | Roy et al. | 52/589.1 |
| 6,314,701 | B1 * | 11/2001 | Meyerson | 52/588.1 |
| 6,363,677 | B1 * | 4/2002 | Chen et al. | 52/586.1 |
| 6,385,936 | B1 * | 5/2002 | Schneider | 52/589.1 |
| 6,386,250 | B1 * | 5/2002 | Liu | 144/231 |
| 6,418,683 | B1 * | 7/2002 | Martensson et al. | 52/282.1 |
| 6,446,413 | B1 * | 9/2002 | Gruber | 52/747.11 |
| 6,449,918 | B1 * | 9/2002 | Nelson | 52/582.1 |
| 6,450,235 | B1 * | 9/2002 | Lee | 160/236 |
| 6,505,452 | B1 * | 1/2003 | Hannig et al. | 52/582.1 |
| 6,553,724 | B1 * | 4/2003 | Bigler | 52/36.1 |
| 6,601,359 | B2 * | 8/2003 | Olofsson | 52/588.1 |
| 6,617,009 | B1 * | 9/2003 | Chen et al. | 428/195.1 |
| 6,647,689 | B2 * | 11/2003 | Pletzer et al. | 52/592.1 |
| 6,647,690 | B1 * | 11/2003 | Martensson | 52/601 |
| 6,651,400 | B1 * | 11/2003 | Murphy | 52/586.2 |
| 6,670,019 | B2 * | 12/2003 | Andersson | 428/90 |
| 6,685,391 | B1 * | 2/2004 | Gideon | 405/16 |
| 6,763,643 | B1 * | 7/2004 | M.ang.rtensson | 52/586.1 |
| 6,766,622 | B1 * | 7/2004 | Thiers | 52/591.3 |
| 6,804,926 | B1 * | 10/2004 | Eisermann | 52/592.1 |
| 6,865,855 | B2 * | 3/2005 | Knauseder | 52/592.1 |
| 6,874,291 | B1 * | 4/2005 | Weber | 52/586.1 |
| 6,948,716 | B2 * | 9/2005 | Drouin | 277/606 |
| 7,051,486 | B2 * | 5/2006 | Pervan | 52/586.1 |
| 7,108,031 | B1 * | 9/2006 | Secrest | 144/358 |
| 7,152,383 | B1 * | 12/2006 | Wilkinson, Jr. et al. | 52/581 |
| 7,219,392 | B2 * | 5/2007 | Mullet et al. | 16/96 R |
| 7,257,926 | B1 * | 8/2007 | Kirby et al. | 52/126.5 |
| 7,337,588 | B1 * | 3/2008 | Moebus | 52/592.4 |
| 7,377,081 | B2 * | 5/2008 | Ruhdorfer | 52/588.1 |
| 7,454,875 | B2 | 11/2008 | Pervan et al. | |
| 7,533,500 | B2 * | 5/2009 | Morton et al. | 52/177 |
| 7,556,849 | B2 * | 7/2009 | Thompson et al. | 428/36.9 |
| 7,584,583 | B2 * | 9/2009 | Bergelin et al. | 52/588.1 |
| 7,614,197 | B2 * | 11/2009 | Nelson | 52/582.1 |

(56) References Cited

U.S. PATENT DOCUMENTS

| | | | | |
|---|---|---|---|---|
| 7,617,651 B2* | 11/2009 | Grafenauer | | 52/592.1 |
| 7,654,055 B2* | 2/2010 | Ricker | | 52/592.1 |
| 7,716,889 B2* | 5/2010 | Pervan | | 52/392 |
| 7,806,624 B2* | 10/2010 | McLean et al. | | 404/47 |
| 7,908,815 B2 | 3/2011 | Pervan et al. | | |
| 7,954,523 B2* | 6/2011 | Liu | | 144/218 |
| 8,302,367 B2* | 11/2012 | Schulte | | 52/747.11 |
| 8,336,272 B2* | 12/2012 | Prager et al. | | 52/588.1 |
| 8,550,257 B2 | 10/2013 | Harvey | | |
| 8,689,512 B2 | 4/2014 | Pervan | | |
| 8,720,148 B2 | 5/2014 | Engstrom | | |
| 2001/0024707 A1* | 9/2001 | Andersson et al. | | 428/60 |
| 2002/0031646 A1* | 3/2002 | Chen et al. | | 428/167 |
| 2002/0069611 A1* | 6/2002 | Leopolder | | 52/748.1 |
| 2002/0170259 A1* | 11/2002 | Ferris | | 52/596 |
| 2002/0178674 A1* | 12/2002 | Pervan | | 52/385 |
| 2002/0178680 A1* | 12/2002 | Martensson et al. | | 52/578 |
| 2003/0009971 A1* | 1/2003 | Palmberg | | 52/578 |
| 2003/0024199 A1* | 2/2003 | Pervan et al. | | 52/589.1 |
| 2003/0037504 A1* | 2/2003 | Schwitte et al. | | 52/586.1 |
| 2003/0084636 A1* | 5/2003 | Pervan | | 52/592.1 |
| 2003/0094230 A1* | 5/2003 | Sjoberg | | 156/91 |
| 2003/0101681 A1* | 6/2003 | Tychsen | | 52/783.1 |
| 2003/0180091 A1* | 9/2003 | Stridsman | | 404/41 |
| 2003/0188504 A1* | 10/2003 | Ralf | | 52/578 |
| 2003/0196405 A1* | 10/2003 | Pervan | | 52/592.1 |
| 2004/0031227 A1* | 2/2004 | Knauseder | | 52/592.1 |
| 2004/0049999 A1* | 3/2004 | Krieger | | 52/245 |
| 2004/0060255 A1* | 4/2004 | Knauseder | | 52/582.2 |
| 2004/0123548 A1* | 7/2004 | Gimpel et al. | | 52/582.1 |
| 2004/0128934 A1* | 7/2004 | Hecht | | 52/578 |
| 2004/0139676 A1* | 7/2004 | Knauseder | | 52/578 |
| 2004/0139678 A1* | 7/2004 | Pervan | | 52/578 |
| 2004/0168392 A1* | 9/2004 | Konzelmann et al. | | 52/589.1 |
| 2004/0182033 A1* | 9/2004 | Wernersson | | 52/578 |
| 2004/0182036 A1* | 9/2004 | Sjoberg et al. | | 52/592.1 |
| 2004/0200175 A1* | 10/2004 | Weber | | 52/592.1 |
| 2004/0211143 A1* | 10/2004 | Hanning | | 52/578 |
| 2004/0250492 A1* | 12/2004 | Becker | | 52/578 |
| 2004/0261348 A1* | 12/2004 | Vulin | | 52/578 |
| 2005/0028474 A1* | 2/2005 | Kim | | 52/578 |
| 2005/0050827 A1* | 3/2005 | Schitter | | 52/578 |
| 2005/0160694 A1* | 7/2005 | Pervan | | 52/582.1 |
| 2005/0166514 A1* | 8/2005 | Pervan | | 52/578 |
| 2005/0210810 A1* | 9/2005 | Pervan | | 52/578 |
| 2005/0235593 A1* | 10/2005 | Hecht | | 52/592.1 |
| 2006/0101769 A1* | 5/2006 | Pervan et al. | | 52/591.1 |
| 2006/0156670 A1* | 7/2006 | Knauseder | | 52/578 |
| 2006/0236642 A1* | 10/2006 | Pervan | | 52/578 |
| 2006/0260254 A1* | 11/2006 | Pervan | | 52/592.1 |
| 2007/0006543 A1* | 1/2007 | Engstrom | | 52/582.1 |
| 2007/0028547 A1* | 2/2007 | Grafenauer et al. | | 52/586.1 |
| 2007/0065293 A1* | 3/2007 | Hannig | | 417/1 |
| 2007/0108679 A1* | 5/2007 | Grothaus | | 267/158 |
| 2007/0151189 A1* | 7/2007 | Yang | | 52/582.2 |
| 2007/0175156 A1* | 8/2007 | Pervan et al. | | 52/582.1 |
| 2007/0193178 A1* | 8/2007 | Groeke et al. | | 52/578 |
| 2007/0209736 A1* | 9/2007 | Deringor et al. | | 144/363 |
| 2008/0000185 A1* | 1/2008 | Duernberger | | 52/578 |
| 2008/0010931 A1* | 1/2008 | Pervan et al. | | 52/403.1 |
| 2008/0017274 A1* | 1/2008 | Burkholder | | 144/134.1 |
| 2008/0028707 A1* | 2/2008 | Pervan | | 52/391 |
| 2008/0104921 A1* | 5/2008 | Pervan et al. | | 52/588.1 |
| 2008/0110125 A1* | 5/2008 | Pervan | | 52/582.2 |
| 2008/0134607 A1* | 6/2008 | Pervan et al. | | 52/395 |
| 2008/0134613 A1* | 6/2008 | Pervan | | 52/582.2 |
| 2008/0236088 A1* | 10/2008 | Hannig | | 52/592.1 |
| 2009/0019806 A1* | 1/2009 | Muehlebach | | 52/588.1 |
| 2009/0100782 A1* | 4/2009 | Groeke et al. | | 52/589.1 |
| 2009/0133353 A1* | 5/2009 | Pervan et al. | | 52/588.1 |
| 2009/0151290 A1* | 6/2009 | Liu | | 52/586.1 |
| 2009/0193741 A1* | 8/2009 | Cappelle | | 52/309.1 |
| 2009/0193748 A1* | 8/2009 | Boo et al. | | 52/589.1 |
| 2009/0193753 A1* | 8/2009 | Schitter | | 52/747.1 |
| 2009/0308014 A1* | 12/2009 | Muehlebach | | 52/592.4 |
| 2010/0043333 A1* | 2/2010 | Hannig | | 52/582.2 |
| 2010/0043921 A1* | 2/2010 | Liu | | 144/117.1 |
| 2010/0083603 A1* | 4/2010 | Goodwin | | 52/589.1 |
| 2010/0135740 A1* | 6/2010 | Harif | | 408/1 R |
| 2010/0173122 A1* | 7/2010 | Susnjara | | 428/119 |
| 2010/0293879 A1* | 11/2010 | Pervan et al. | | 52/588.1 |
| 2010/0300029 A1* | 12/2010 | Braun et al. | | 52/588.1 |
| 2010/0319291 A1* | 12/2010 | Pervan et al. | | 52/588.1 |
| 2011/0030303 A1 | 2/2011 | Pervan et al. | | |
| 2011/0167750 A1* | 7/2011 | Pervan | | 52/588.1 |
| 2011/0225922 A1* | 9/2011 | Pervan et al. | | 52/588.1 |
| 2012/0017533 A1* | 1/2012 | Pervan et al. | | 52/588.1 |
| 2012/0145805 A1 | 6/2012 | Yamada | | |
| 2012/0279161 A1* | 11/2012 | Hakansson et al. | | 52/588.1 |
| 2013/0008117 A1* | 1/2013 | Pervan | | 52/588.1 |
| 2013/0014463 A1* | 1/2013 | Pervan | | 52/588.1 |
| 2013/0019555 A1* | 1/2013 | Pervan et al. | | 52/588.1 |
| 2013/0042562 A1* | 2/2013 | Pervan et al. | | 52/582.2 |
| 2013/0042563 A1* | 2/2013 | Pervan et al. | | 52/582.2 |
| 2013/0042564 A1* | 2/2013 | Pervan et al. | | 52/588.1 |
| 2013/0042565 A1* | 2/2013 | Pervan et al. | | 52/588.1 |
| 2013/0047536 A1* | 2/2013 | Pervan | | 52/309.1 |

FOREIGN PATENT DOCUMENTS

| | | |
|---|---|---|
| DE | 10 2006 037 614 B3 | 12/2007 |
| DE | 10 2011 056 156 A1 | 6/2012 |
| DE | 10 2007 018 309 B4 | 7/2013 |
| EP | 0 098 162 B1 | 5/1991 |
| EP | 1 415 056 B1 | 1/2006 |
| EP | 1 650 375 A1 | 4/2006 |
| EP | 1 276 941 B1 | 1/2009 |
| WO | WO 97/47834 A1 | 12/1997 |
| WO | WO 00/47841 A1 | 8/2000 |
| WO | WO 2007/008139 A1 | 1/2007 |
| WO | WO 2008/004960 A2 | 1/2008 |
| WO | WO 2011/085825 A1 | 7/2011 |
| WO | WO 2011/127981 A1 | 10/2011 |

OTHER PUBLICATIONS

International Search Report issued in International Application No. PCT/EP2012/064905 dated Oct. 19, 2012 (with translation).
U.S. Appl. No. 14/235,887, filed Jan. 29, 2014.
Jun. 23, 2015 Office Action issued in U.S. Appl. No. 14/235,887.

* cited by examiner

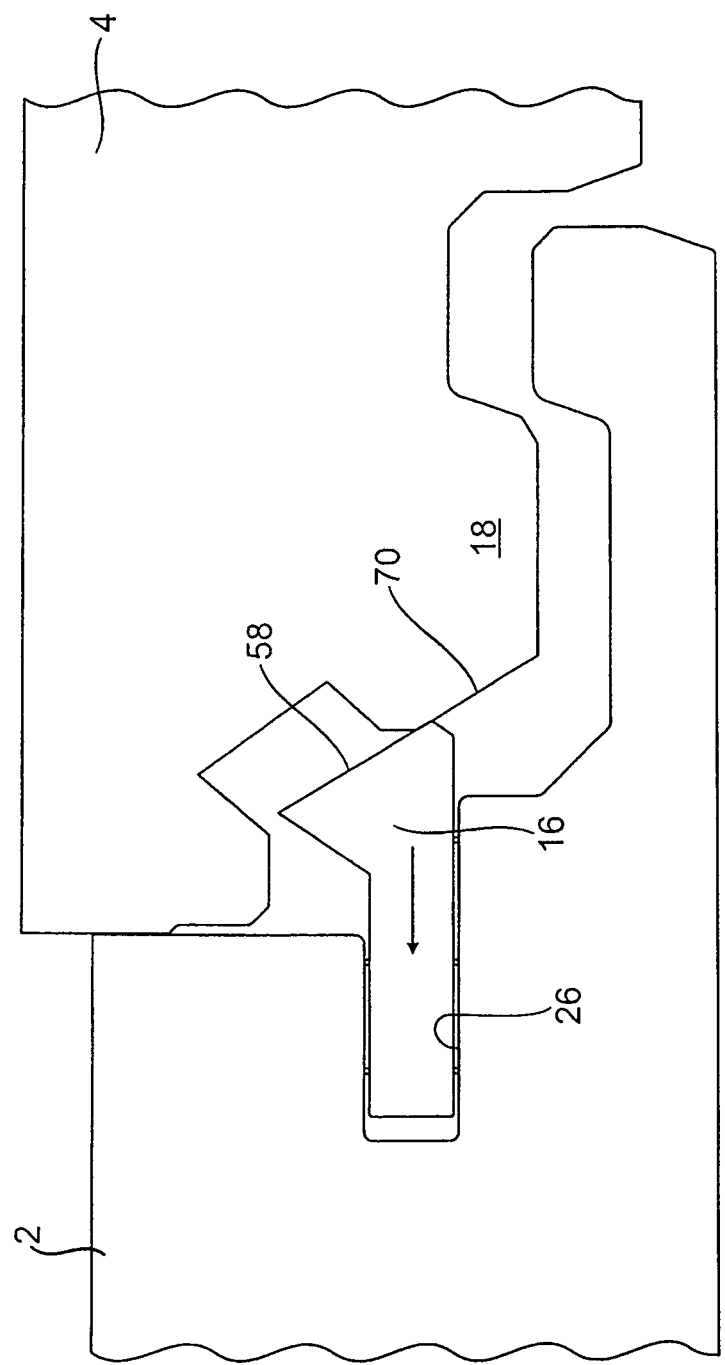

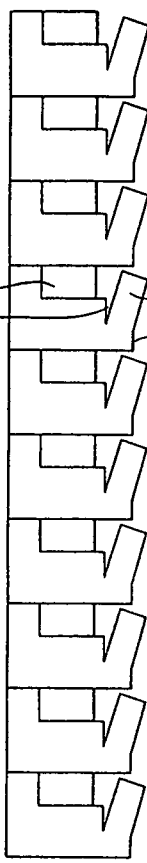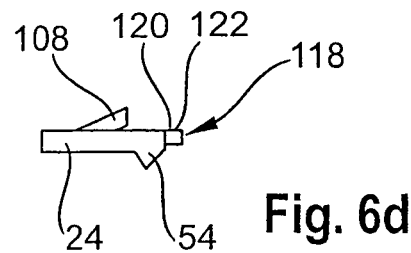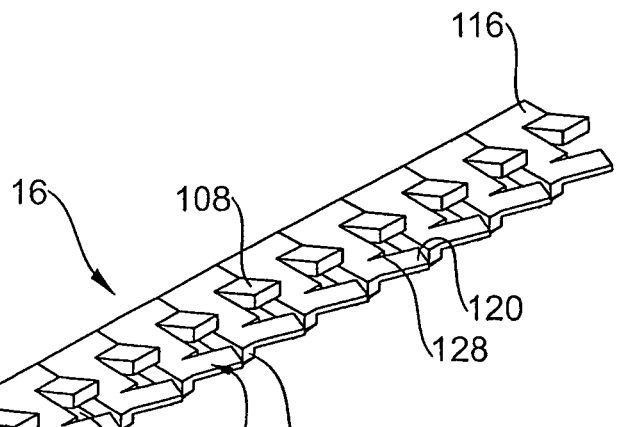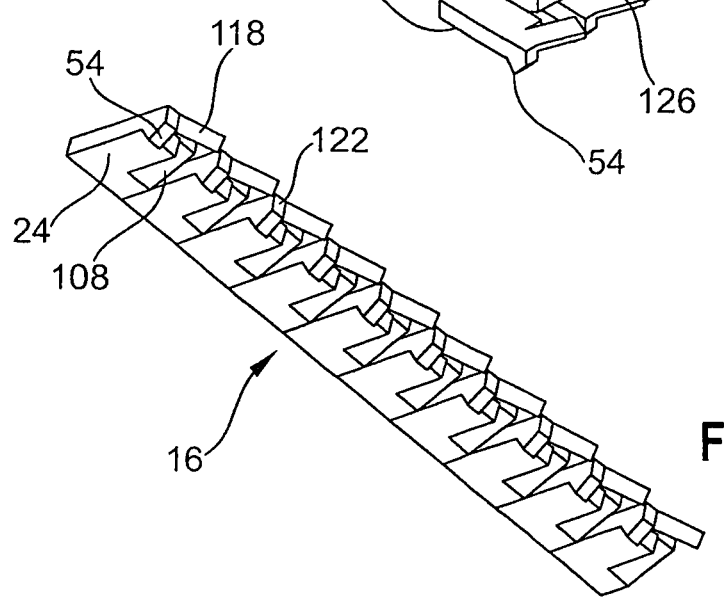

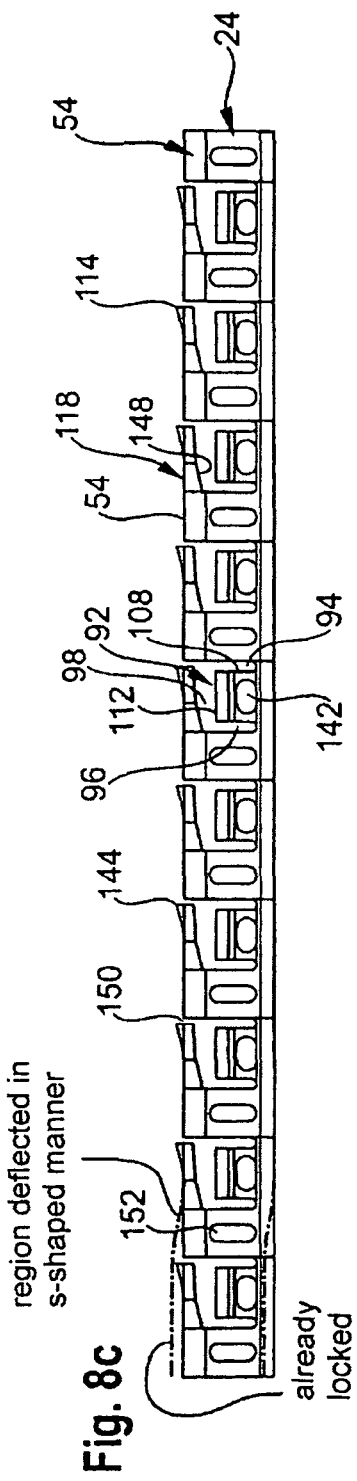
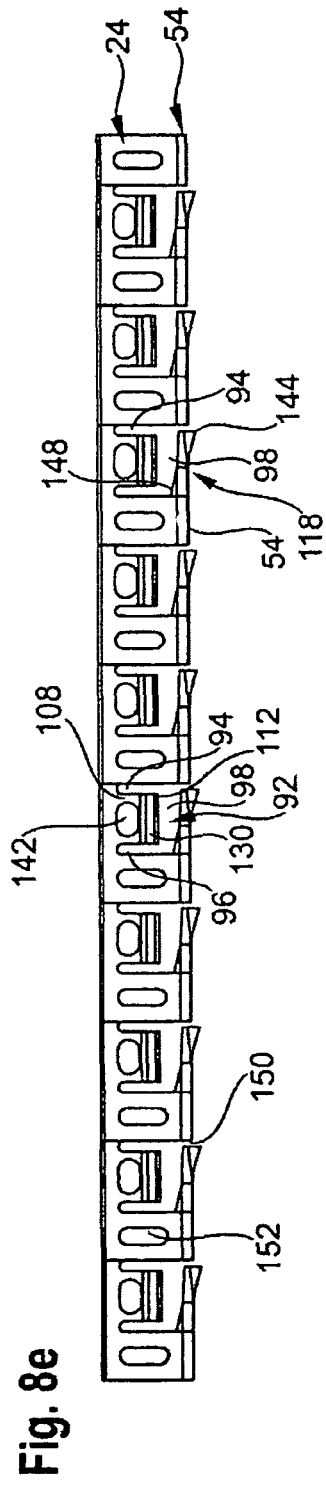

CONNECTION FOR ELASTIC OR PANEL-TYPE COMPONENTS, PROFILED SLIDE, AND FLOOR COVERING

The invention relates to a connection for elastic or rigid panel-type components, in particular for floor panels, in accordance with the preamble of claim 1, to a floor covering provided with such a connection, and to a profiled slide for such a connection.

Under the heading "click connection" a plurality of solutions are presently offered which enable the glueless connection of laminate or parquet floors/panels.

The long-side connection of the panels is performed via glueless tongue and groove joints with horizontal and vertical locking as described in EP 0 098 162 B1, WO 97/478 34 A1, or DE 199 62 830 C2. These connection profiles may be brought into locking engagement by angling or horizontal displacement. A problem with these solutions is the front-end connection of adjacent panels since they can only be connected by horizontal displacement ("hitting"). Such an installation is relatively complex. For this reason, connections have become prevalent in which the front-end connection takes place by angling a panel to be installed relative to a panel that has already been installed. Such connection profiles to be connected by angling are also referred to as "hook profiles" or "press button profiles". With these profiles, a panel to be installed is positioned angularly along the long sides of a panel that has already been installed, wherein, for instance, a tongue of the panel to be installed immerses into a groove of the panel that has already been installed. Subsequently, the panel to be installed is angled from its angular position downward, with the tongue immersing completely into the groove and the horizontal locking means at the long sides engaging each other, so that the two panels are locked along the longitudinal edge. During this angling process the front-end profiles of the panel to be installed are also brought into locking engagement with a front-end adjacent panel without a "hitting" in the horizontal direction being necessary.

Such connection is, for instance, known from EP 1 276 941 B1. In this known solution, a locking projection immerses into a locking recess of the other panel during angling, wherein a locking projection of the panel then snaps into a locking recess of the other panel for vertical locking. These locking projections and locking recesses must, caused by the construction, be relatively small since a catch mechanism by elastic deformation of the material is possible. This document also illustrates a variant in which the locking projection is effected by an inserted flexible element.

Similar solutions are disclosed in DE 10 2005 002 297 A1 and in EP 1 415 056 B1.

EP 1 650 375 A1 describes a solution in which a tongue is inserted into an accommodation groove of a component for locking, said tongue being approximately U-shaped or arcuate in top view. In the unlocked condition, the basis of the U-shaped tongue projects toward the other panel and is deformed inwardly into the accommodation groove of the other panel during angling, and then, due to its resilience, snaps after the complete angling of the panel into an accommodation such that the panels are fixed in position at the front end.

A disadvantage of all these solutions is that a comparatively large force is required for locking since the elastic force of an insert has to be overcome or else the basic material of the panel, for instance, HDF/MDF has to be deformed elastically so as to effect the catch mechanism.

So-called "side push systems" have also been launched in the market in which a slide is incorporated at the front end of a panel which, by arranging a further panel at the long side, is adapted to be brought into locking engagement with a front-end adjacent panel that has already been installed. The first workable side push solution is described in DE 10 2007 018 309. Similar solutions are also explained in documents DE 10 2006 037 614 and WO 2008/004 960 A2 which were published later than the afore-mentioned one.

A disadvantage with these "side push solutions" is that the slide has to project at the long side—in the case of an undesired displacement of the slide position prior to the installation the establishing of the long-side connection is possible with increased effort only.

Recently, elastic floors of plastic material (PVC, PP, PET, etc.) have also been designed with connections that are used in the case of rigid, panel-type floors.

In DE 10 2011 056 156 of the applicant, the priority of which is claimed in the instant patent application, a connection for elastic or—in the broadest sense—rigid components, for instance, floor panels or tiles, is described for overcoming the afore-mentioned disadvantages. In this connection, the vertical lock is performed via a profiled slide which is, during the angling process of the component to be installed toward a component that has already been installed, moved in a sliding manner from a release position in the direction of a locked position due to a suitable design of the contact faces. This movement is performed without the overcoming of a resilient force or the like, so that this solution is distinctly superior to the initially described solutions. The advantage over side push systems consists in that the locking process is performed via the component to be positioned, whereas in the side push systems the locking process is performed by the positioning of a third component. If such a third component cannot be positioned (for example in the region of walls), this locking process has to be performed manually by a tool or the like.

A precondition of all these systems is, however, that elements for horizontal lock are provided in addition to the vertical lock via the tongue or the profiled slide used. This horizontal lock is usually performed via a shearing block on one component which is engaged behind by a locking projection on the other component and thus determines the withdrawal strength.

The forming of such a shearing block requires considerable manufacturing effort, wherein, on the one hand, complex milling cutters are required and, on the other hand, relatively much material has to be milled off to form the shearing block and the groove underlip with the locking projection.

As compared to this, it is an object of the invention to provide a connection for elastic or rigid panel-type components, in particular floor panels, a floor covering provided with such a connection, and a profiled slide, which enable easy vertical and horizontal locking.

This object is solved by a connection with the features of claim 1, by a profiled slide with the features of claim 21, and by a floor covering with the features of claim 31.

Advantageous further developments of the invention are the subject matters of the subclaims.

In accordance with the invention, such a connection for elastic or panel-type components, in particular floor panels, comprises a lock which acts along adjacent lateral edges of two components which can be brought into engagement by lowering or angling one of the components relative to the component that has already been installed. A locking element is thereby guided in a movable manner on one component, said locking element being adapted to be brought into locking engagement with a locking recess on the other component for the purpose of a vertical lock at said lateral edge. In accordance with the invention, this locking element is designed such that the horizontal lock and the vertical lock are substantially performed by this locking element, so that a separate horizontal lock, for instance, the manufacturing of a shearing block and of a locking projection engaging behind it, may be renounced. This means that the connection according to the invention may be designed without so-called "hook connections". The effort with respect to manufacturing technology, in particular the milling of the front-side profile, is thus quite considerably facilitated as compared to the conventional solutions, wherein in addition less material has to be removed during the milling process, so that the material costs are reduced. On principle, the profiled slide may comprise at least two surface sections effecting a vertical lock which are spaced apart from each other and which are reversely effective. The applicant reserves the right to direct an own claim on the principle with two surface sections for horizontal lock.

In accordance with the invention, the function of a shearing block used with the "hook connections" mentioned is thus incorporated in the profiled slide, wherein appropriately effective functional elements are formed thereon which, on the one hand, provide a vertical lock and, on the other hand, a horizontal lock.

In one embodiment, the locking element is a profiled slide provided with a locking projection having a first guiding surface that is positioned angularly relative to the installation plane. A locking surface or another region of the locking recess will run on said guiding surface during the angling process, so that the profiled slide is movable from a release position into a locked position. This movement is performed directly from the release position into the locked position and not, as in prior art, by a tongue first being elastically deformed contrary to the locking direction and then snapping back.

The solution of the invention has the advantage that locking is effected alone by the lowering or angling of a component, wherein the profiled slide is pushed to slide into its locked position without noticeable resistance. Thus, a resilient force or elasticity of a locking projection such as with the afore-described "push button profiles" need not be overcome to effect the locking engagement. In these known systems, the lowering of a panel toward the other panel that has already been installed causes the tongue or the locking projection to be elastically deflected inwardly. It will then snap back into its locked position after the complete lowering of the panel. In the system according to the invention the profiled slide is moved directly in the locking direction without noticeable resistance.

As compared to the side push systems the system according to the invention has the advantage that the arranging of a third panel at the long side is not necessary. Accordingly, the connection according to the invention is, on the one hand, characterized by a high installation comfort and, on the other hand, by little effort with respect to the device technology.

The profiled slide according to the invention may be guided both in the component that has already been installed and in the component to be installed.

In one embodiment of the invention the guiding surface in the locked position engages behind the locking surface or another circumferential section of the locking recess, wherein the locking projection comprises a support face being in contact with an abutment wall of the locking recess in this locked position. This double-sided contact of the profiled slide with the lowered/angled component causes a reliable horizontal and vertical locking since the profiled slide is positively locked with the angled/lowered component.

The connection is particularly uncritical in the case of a change of position of the profiled slide prior to the installation if the locking projection is designed such that during lowering the guiding surface runs on the locking surface, so that the profiled slide, during further lowering, is, by a force component acting in the locking direction, movable in the locking direction until the support face is in contact with the abutment wall in the locked position. The slide is thus restraint-guided in the direction of its locked position.

For the sake of good order it is pointed out that the term "run on" does not necessarily define that the moving component runs on a stationary component. This term is used in the instant application also if a face provided on a component that has already been installed gets, during the lowering process of another component, into contact with a corresponding face of this component. This means that the face section that runs on may be provided on the component that has already been installed or on the component to be installed.

In one embodiment of the invention it is provided to form at least one tongue on the profiled slide which extends from the profiled slide, in particular from a flat slide plane, and effects part of the horizontal lock. One tongue is preferably oriented in counter-direction to the locking projection. A further tongue (flexible tongue) may be formed on the profiled slide which effects a locking in counter-direction.

The manufacturing of such a tongue is particularly simple if it is formed by a region of the flat slide section that has been cut clear. This clear cut is preferably made in slot- or U-shape, wherein the "U" encompasses the flexible tongue. Such clear cuts can be formed in a relatively simple manner in the injection molding tool.

In one variant of the invention, an abutment wall is formed on one component, said abutment wall being adapted to be brought into contact with an element of the profiled slide. This element is preferably formed on the afore-mentioned tongue.

The abutment wall is preferably provided as a front face of a groove on the component on which the profiled slide is guided in a movable manner.

In one embodiment this groove is formed as a shifting recess in which the element, for instance, the end section of the tongue, is accommodated during the movement from the release position into the locked position.

The forming of the profiled slide is particularly easy if one tongue extends from the side that is far from the locking projection and a further one extends in counter-direction. Both tongues then act as functional elements for horizontal lock.

For improving the elasticity of the tongues, they may be provided with recesses or slots.

In one embodiment the guiding surface and the support face may be designed to be approximately parallel to each other.

The locking may, for instance, also be improved in the case of an uneven underground in that the abutment wall or else the locking surface are designed such that a substantially linear or punctual abutment exists in this region and undesired releasing is thus prevented. This effect may, for instance, be caused by a concave curvature of the abutment wall, so that no extensive contact exists between the locking surface and the abutment wall. It will be understood that other geometries may also be chosen to avoid an extensive contact in the area between the locking surface and the abutment wall. On principle, the contact area between the guiding surface and the support face might also be designed such that no extensive contact exists in the locked position, so that undesired releasing is avoided.

The pitch angle of the guiding surface may be between 30° and 60°, preferably approximately 50°.

In an embodiment that is particularly easy to manufacture the locking projection has, in a view parallel to the installation face, approximately the shape of a triangle, with the guiding surface being provided at the rear side. Furthermore, the profiled slide is designed with a front face facing the locking recess, which is spaced apart from a rear wall of the locking surface in the locked position.

In one embodiment of the invention the locking projection of the profiled slide is provided with a slot. This slot ends preferably in a front face of the locking projection. Due to the design of the locking projection which is elastic to a certain extent the movement process from the release position into the locked position can be improved.

In one variant of the invention the profiled slide has a flat slide section guided in a movable manner in the locking direction in a guide groove of the first component.

The depth of a guide groove is preferably chosen such that the guide face is aligned with respect to the locking surface when the locking profile fully immerses into the guide groove. Thus, the wrong positioning of the slide in the first component which would aggravate installation is made difficult.

The shifting of the profiled slide in the front edge direction may be prevented by suitable stops.

The connection of the long sides of the components is preferably performed by a locking profile that is adapted to be brought into locking engagement by angling.

As already mentioned, the locking element, in particular the profiled slide, may be provided in the component to be installed or else in the component that has already been installed. This means that in the latter case the component to be installed is lowered toward the profiled slide. It has turned out that this variant has a certain advantage since in the case when the profiled slide is guided in the component to be angled, the upper flange of the groove is of relatively weak design and thus tends to stand up since no counteraction takes place in this region. This standing up in turn results in an overshot. If the profiled slide is guided in the component that has already been installed, the lower flange of the groove will be wakened in correspondence with the inversion of the profile geometry, but this weakening does not result in a standing up in the effective area, but at most in the support area. There, however, this standing up does not play any role since an insulating layer or the like is usually provided to compensate for such standing up.

The horizontal lock is particularly effective if the profiled slide, as already mentioned, is designed with a further tongue, in the following referred to as flexible tongue, extending in the direction of the locking projection and having a horizontal locking face formed thereon which engages behind a lock face on the other component in the locked position. This engagement behind and possibly the effective engagement of the afore-described tongue substantially determine the withdrawal strength of the two connected components and moreover reliably prevent a relative movement of the profiled slide with respect to the connected components in cooperation with the horizontal locking projection on the other flexible tongue, so that high withdrawal forces can also be implemented.

In accordance with the invention it is preferred if this horizontal locking face is inclined relative to the vertical to a higher degree than the locking surface of the locking projection.

The structure of the profiled slide is particularly compact if the lock face is formed on a notch of the locking recess. This notch may, for instance, end in the locking surface of the locking recess.

The flexible tongues/tongues may be deflected elastically to some extent during the movement of the profiled slide, so that the functional elements formed thereon slide off without noticeable resistance during the movement of the profiled slide and then snap back into their predetermined position on reaching the locked position and thus prevent that the profiled slide can be moved back.

In one embodiment of the invention a support face of the profiled slide is formed in sections by a support finger extending laterally away from the locking projection in the direction to the other component.

This support finger may be formed by the clear cut by which the flexible tongue or the tongue is formed.

It is of advantage if the profiled slide is provided with a plurality of recesses or cuts. These recesses or cuts which extend transversely to the longitudinal direction of the profiled slide provide it with certain elasticity. The result of this is that the profiled slide is adapted to be deflected elastically in the direction of movement and is thus capable of adapting itself automatically toward the other component during the lowering process of the one component, so that squeezing of the areas which are successively getting into contact with each other during the lowering movement is avoided.

The profiled slide according to the invention preferably has a flat slide section that is guided in a guide groove of a component, and a locking projection effecting the horizontal locking with the other component.

The profiled slide according to the invention is furthermore formed with a tongue effecting part of the horizontal lock or the fixing of the position of the profiled slide.

As mentioned above, this tongue may be formed by a clear cut preferably of slot- or U-shape.

Furthermore, the profiled slide comprises a support finger forming part of the support face of the locking projection.

This laterally projecting support finger is particularly simple to manufacture if it is part of the clear cut by which the tongue/flexible tongue is formed.

In one embodiment the profiled slide has a further flexible tongue extending in the direction of the locking projection and having a horizontal locking face formed thereon.

This further flexible tongue projects preferably from the locking projection of the profiled slide.

The horizontal locking face of this further flexible tongue may be inclined relative to the vertical with respect to a guiding surface of the locking projection.

The sliding guiding of the guide section within the guide groove is facilitated if a plurality of nubs, preferably of plastics, is provided on the flat slide section by means of which the flat slide section slides off in the guide groove.

In order to avoid squeezing of the areas that are successively getting into contact during the angling of the one component in the direction of the other component, in particular the locking surface and the abutment wall, the profiled slide is designed to have a predetermined elasticity in the installing direction which enables the locking projection to slide into the locking recess of the other component without excessive resistance. This transverse elasticity may be provided by cuts or recesses of the profiled slide. These recesses may be provided on the flat slide section and/or else in the region of the locking projection. Particularly good elasticity is achieved if such recesses are provided alternately on the flat slide section and on the locking projection. This transverse elasticity is explained in detail in the parallel patent application, so that, with reference to these explanations which count among the disclosure of the instant patent application, a repetition of the statements is renounced.

In all embodiments, a chamfer-like bevel in which a peak of the locking projection and/or a guiding surface of the locking projection ends may be formed on the front side of the locking projection of the profiled slide. This bevel is preferably arranged on the side of the profiled slide which is the first to get into contact with the floor element to be angled or that has already been installed, so that the run-in behavior is improved and hence "squeezing" can be prevented.

The floor covering consisting of a plurality of floor panels with the connection according to the invention is characterized by being very simple to install, with the formation of gaps during heating periods being reduced to a minimum.

The connection according to the invention is not restricted to the use with panels for floors, wall or ceiling coverings. On principle, such a connection may be used with all applications in which planar, elastic or rigid components have to be connected with each other in a detachable manner. Thus, the connection may, for instance, be used in furniture industry for cabinet systems or the like.

In the embodiments according to the invention, the profiled slide is supported in the horizontal locking direction on sections of the panels. For optimizing stability, it is provided in accordance with the invention that these support or holding webs have a breadth between 1 mm and 4 mm, preferably in the range between 2.0 mm and 2.5 mm (see for example FIG. 9). The applicant reserves the right to direct a subclaim on these holding webs, wherein it is valid for all embodiments.

Figure 2:
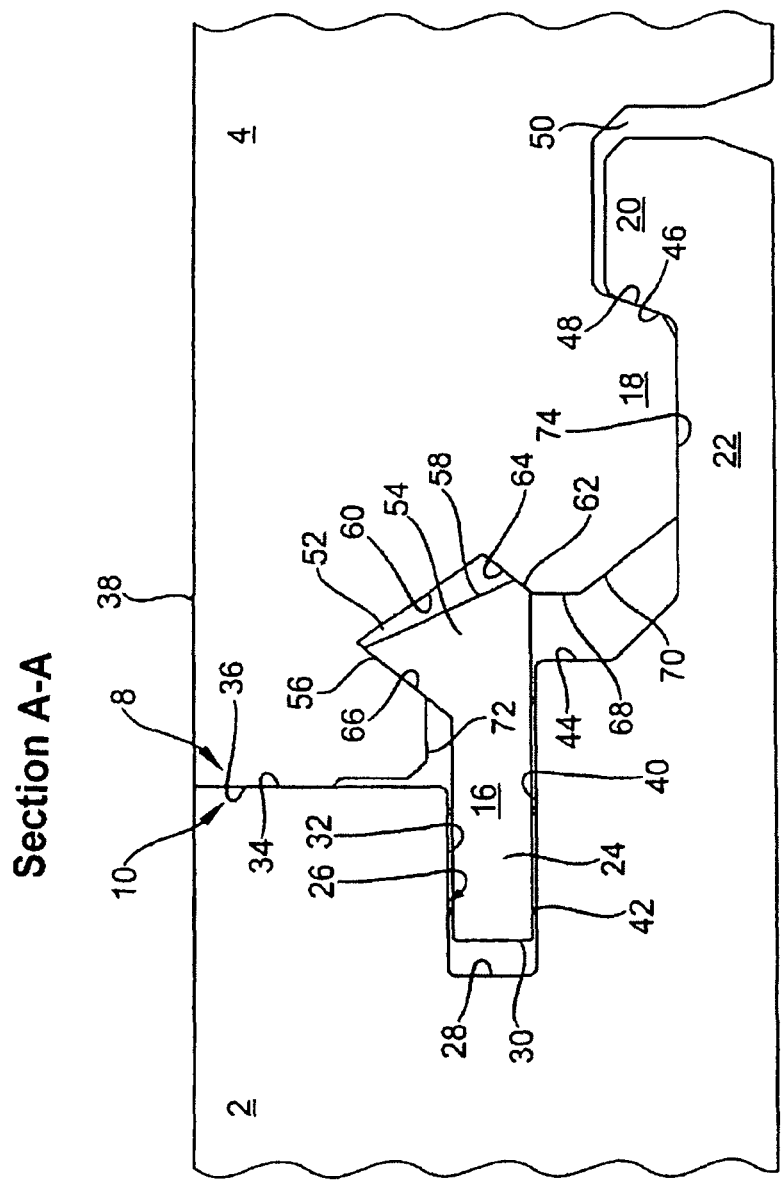
Figure 4A:
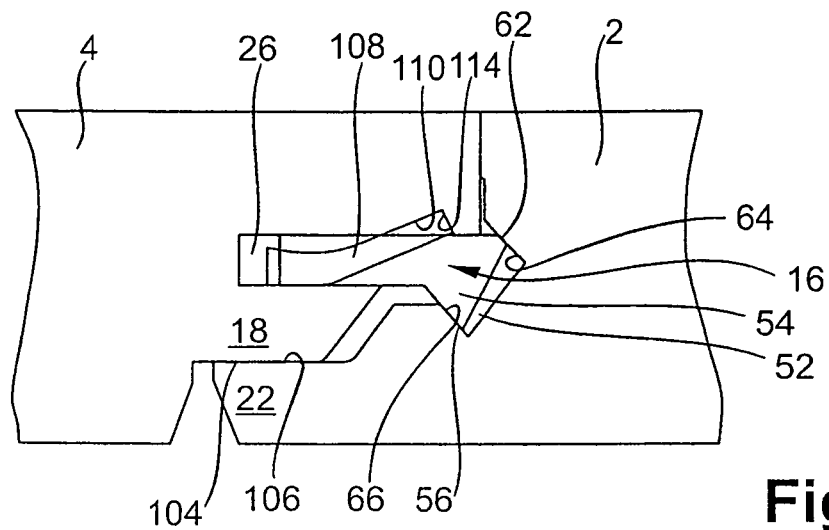
Figure 4B:
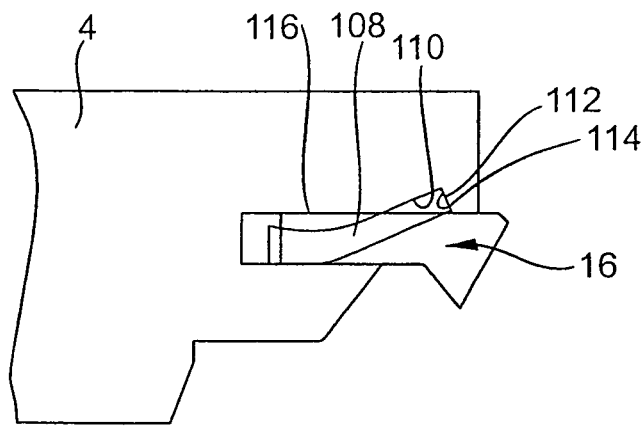
Figure 4C:
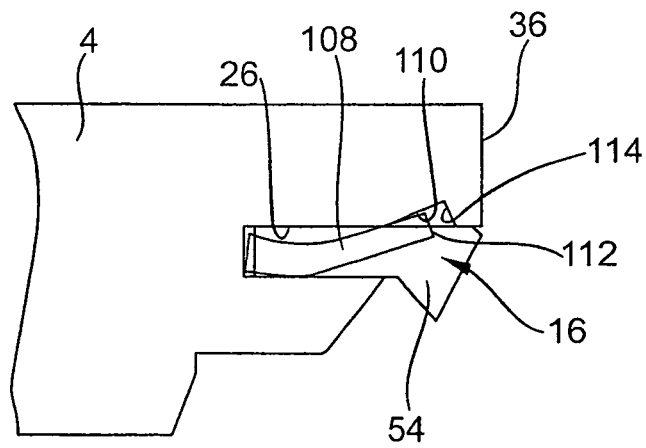
Figure 5:
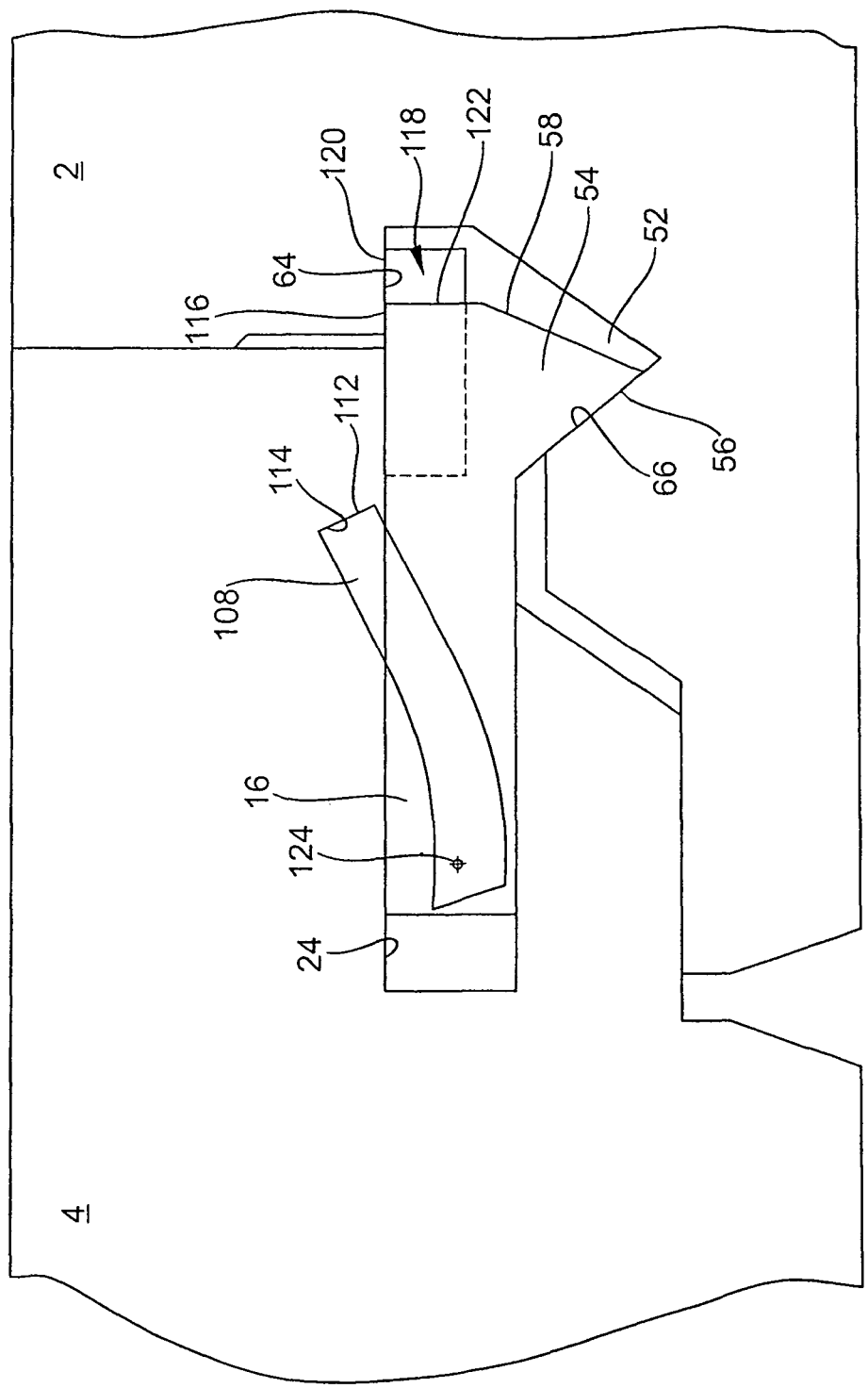
Figure 7:
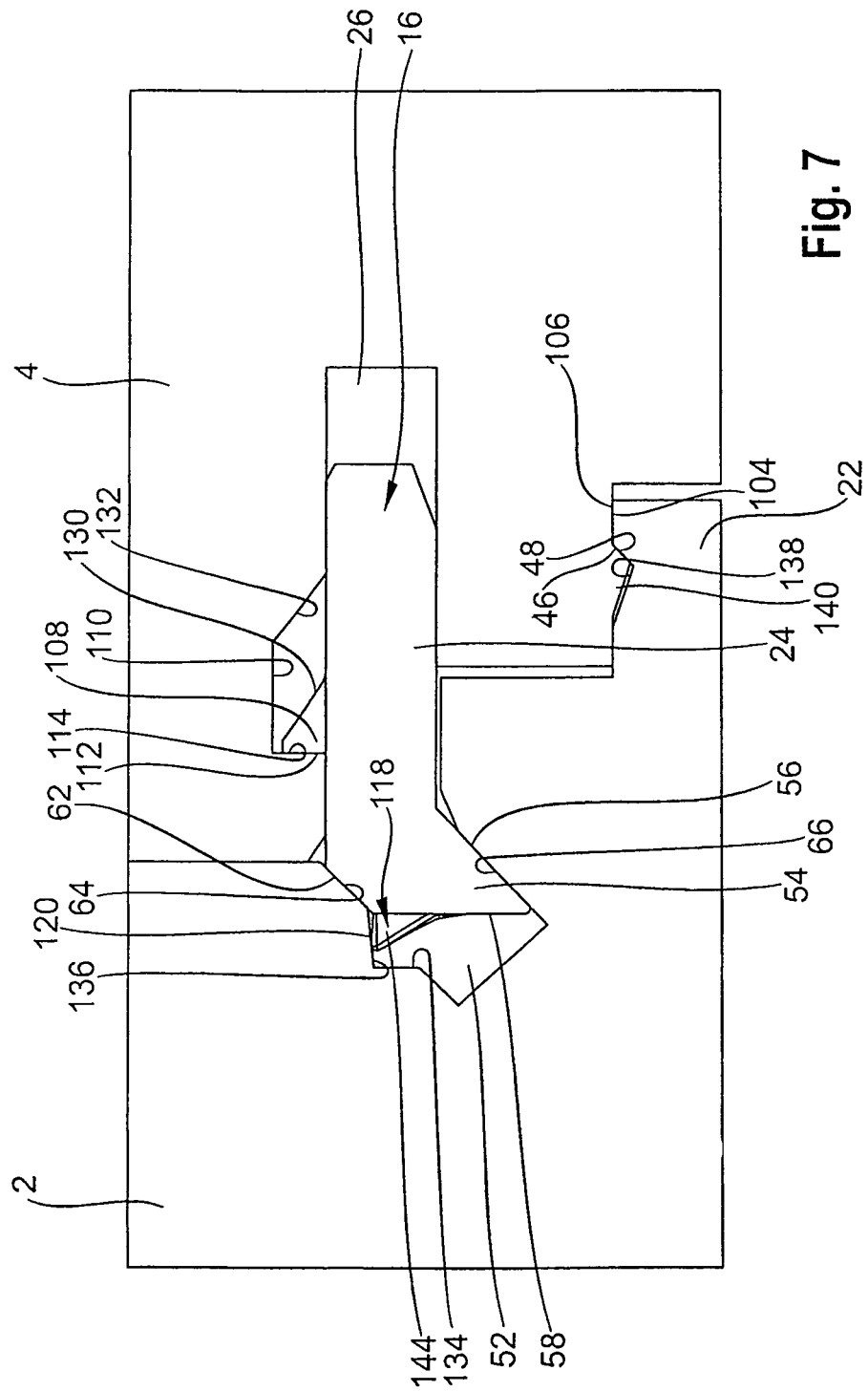
Figure 9:
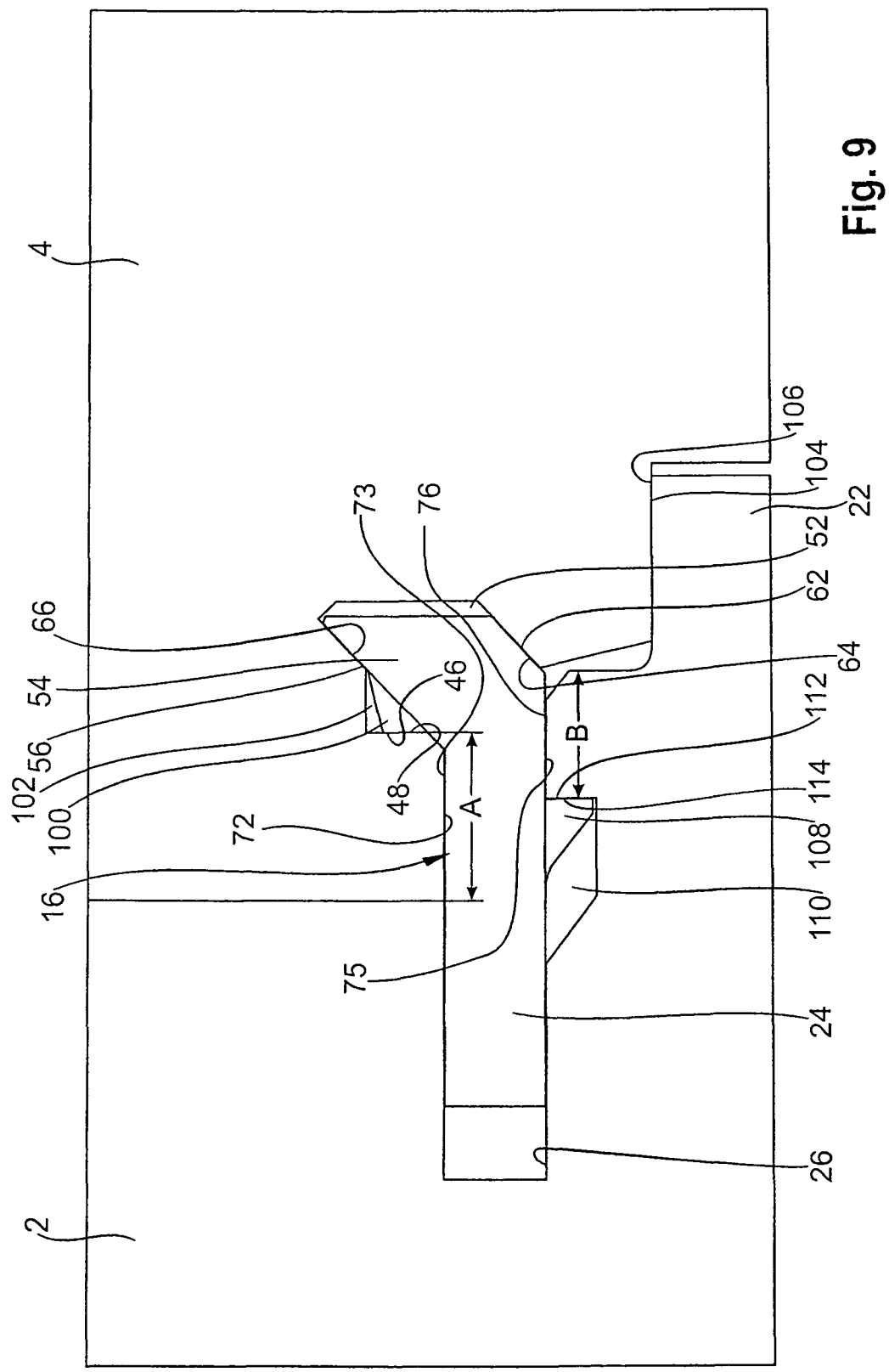
Figure 11:
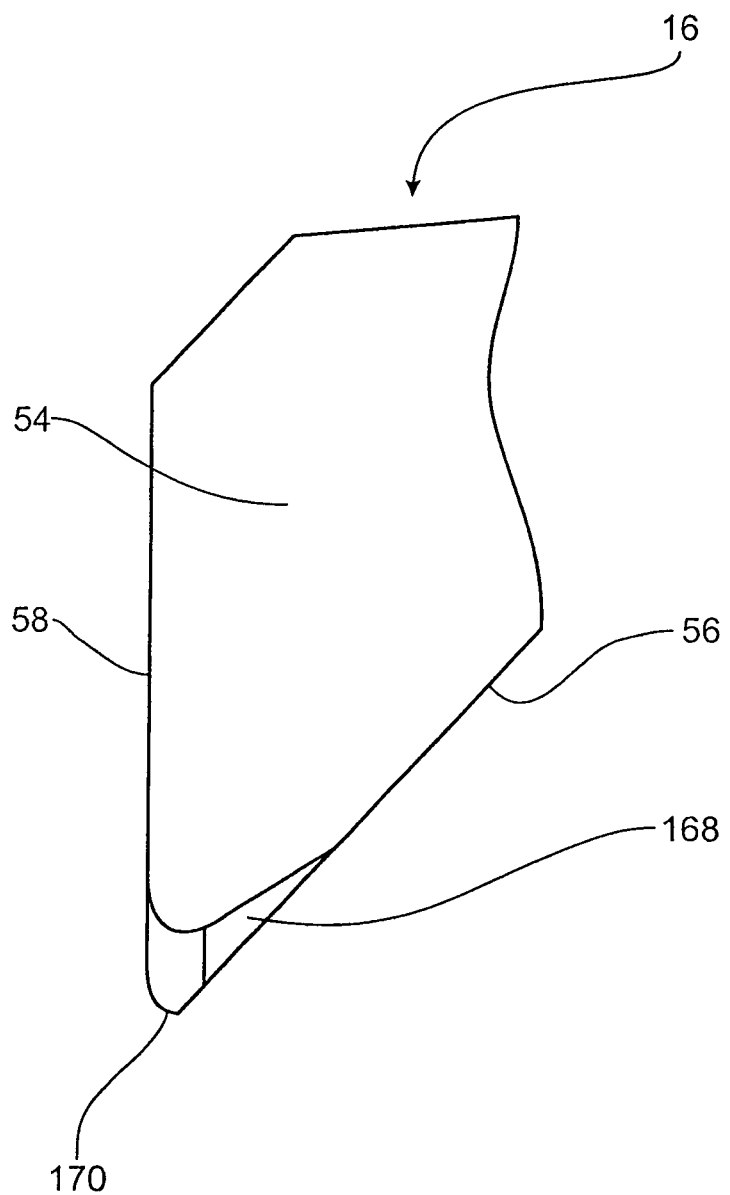
Figure 12:
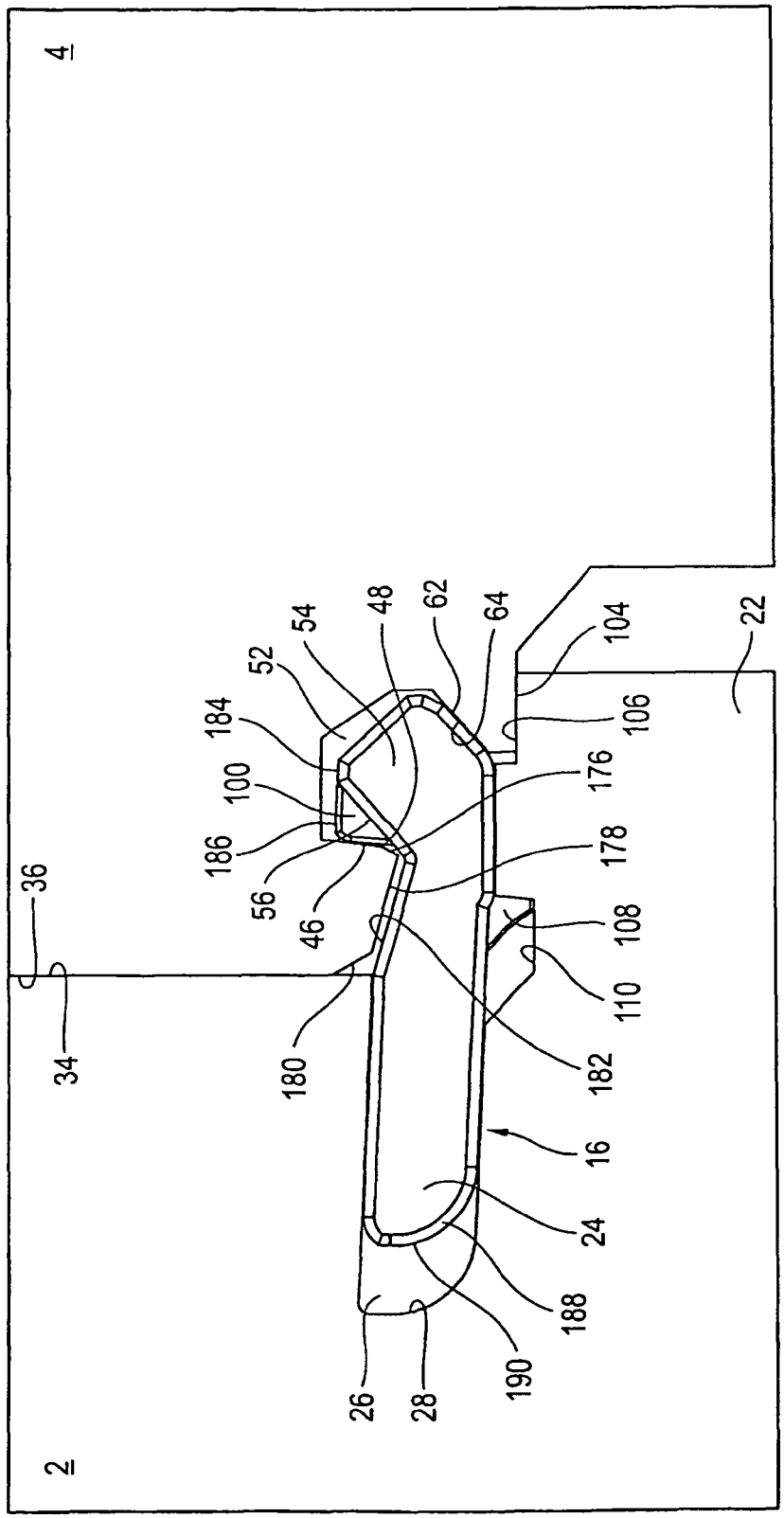
Figure 13A:
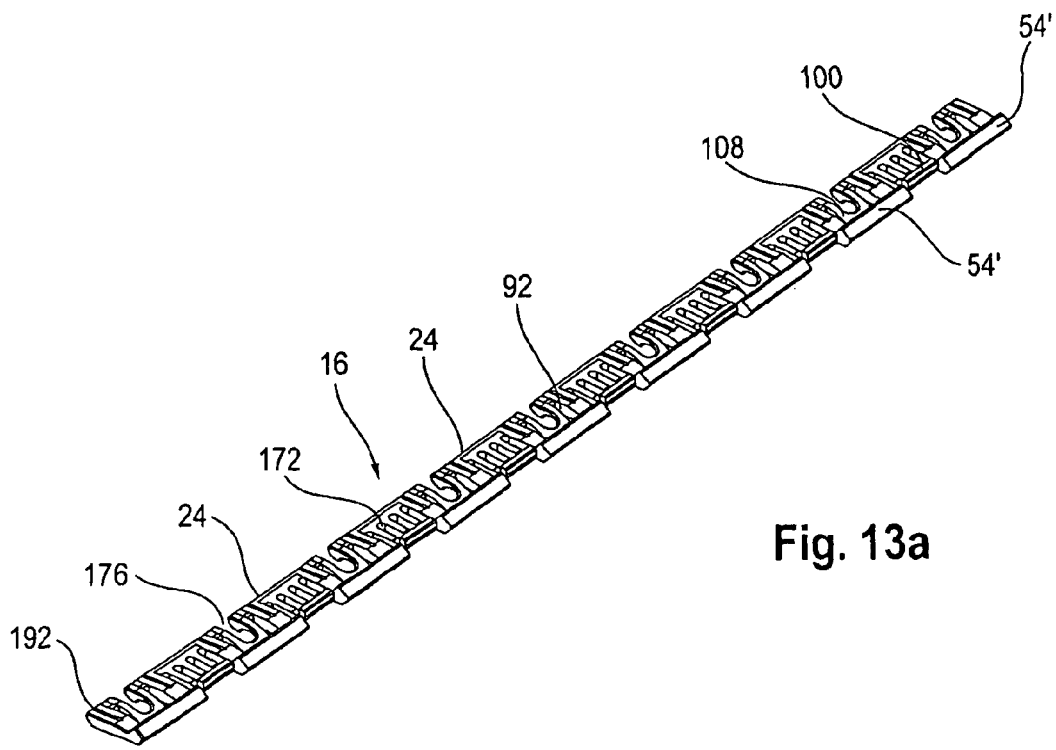
Figure 13B:
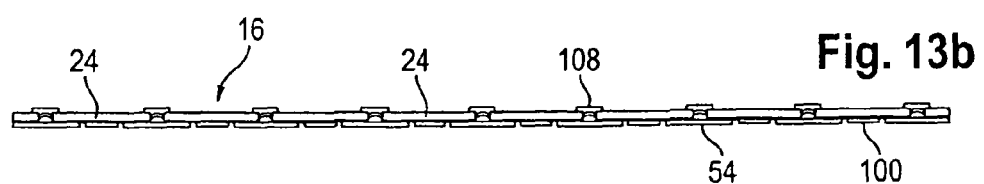
Figure 13C:
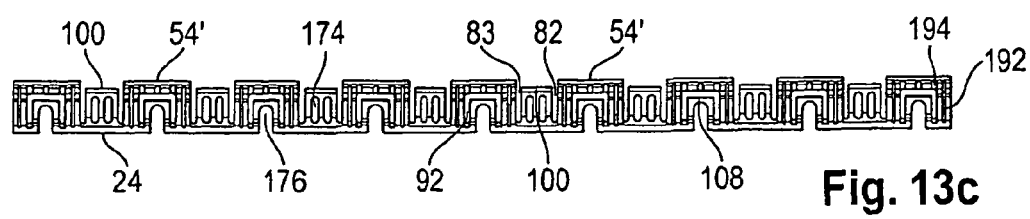
Figure 13D:
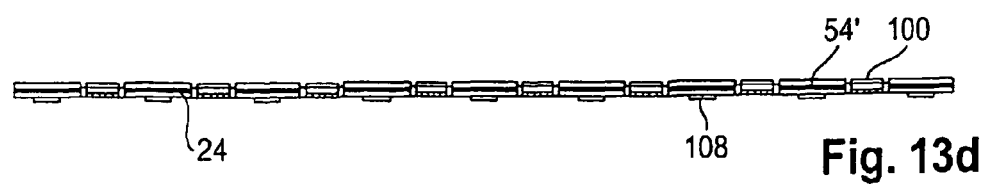
Figure 14:
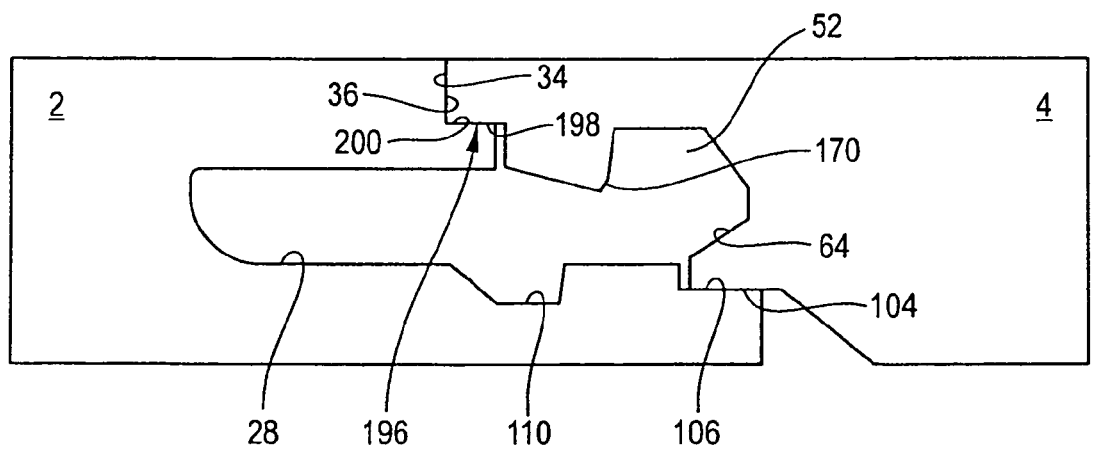

Preferred embodiments of the invention will be explained in more detail in the following by means of schematic drawings. There show:

FIG. 1 a schematic illustration of a floor covering consisting of floor panels in accordance with the invention;

FIG. 2 a section of a connection that is not part of the invention along line A-A in FIG. 1;

FIGS. 3a to 3d an installation process of two front-end adjacent floor panels with a connection according to FIG. 2;

FIGS. 4a to 4c sections along line A-A in FIG. 1 of a first embodiment of the invention;

FIG. 5 a section along line A-A in FIG. 1 of a second embodiment;

FIGS. 6a to 6d views of a profiled slide of the embodiment according to FIG. 5;

FIG. 7 a section along line A-A in FIG. 1 of a third embodiment;

FIGS. 8a to 8e views of a profiled slide of the embodiment of FIG. 7;

FIG. 9 a sectional view of a fourth embodiment;

FIGS. 10a to 10f views of a profiled slide of the embodiment pursuant to FIG. 9;

FIG. 11 a bevel on the locking projection of the profiled slide according to the invention;

FIG. 12 a sectional view of a connection of two floor panels according to a further embodiment;

FIGS. 13a to 13d various views of a profiled slide of the connection of FIG. 12; and FIG. 14 a variant of the embodiment illustrated in FIG. 12.

FIG. 1 illustrates a strongly schematized top view of a floor covering 1 consisting of a plurality of floor panels, in the following referred to as panels, three of which are by way of example designated with reference numbers 2, 4, 6 in FIG. 1. In the illustration of FIG. 1 the two panels 2, 4 contact each other at the front end along their front edges 8, 10. A longitudinal edge 12 of the panel 2 is connected with a longitudinal edge 14 of the panel 6. This longitudinal edge 14 is also connected with the adjacent longitudinal edge (which is not provided with a reference number in FIG. 1) of the further panel 4. The panels may, for instance, be designed as laminate or parquet floors.

The floor panel may be used for a comparatively rigid floor covering such as, for instance, a parquet floor, a laminate floor, or a tiled floor. On principle, the floor panel may also be designed with an elastic, soft cover face in the case of an elastic floor covering, for instance, a PVC floor or a floor of PVC substitute material. Such floors may also be designed with a carrier of plastics, HDF/MDF, or wood-plastics compound.

At the long sides locking profiles are formed, such as they are explained in the introduction of the description. With these profiles, for instance, the panel 2 is locked at the long side by arranging it angularly with respect to the panel 6 that has already been installed, and by subsequent angling. The front-end connection of two adjacent panels 2, 4 will be explained by means of the following Figures.

FIG. 2 illustrates a section along the line A-A in FIG. 1 which thus extends through the two front edges 8, 10 of the panels 2 and 4, respectively, wherein FIG. 2 illustrates a connection as described in the parallel patent application whose disclosure is to count among that of the instant application. The vertical locking is, in accordance with the invention, performed by a profiled slide 16 while the horizontal locking is substantially performed by a shearing block 18 engaged behind in the horizontal direction by a horizontal locking projection 20 of an extended groove underlip 22 and by the front-end abutment of the front edges 8, 10.

In the illustration of FIG. 1 the profiled slide 16 consists substantially of a flat slide section 24 that is guided in a guide groove 26 of the panel 2. In the illustrated embodiment this guide groove 26 is designed approximately as a square groove in the illustration of FIG. 2. A groove bottom 28 is formed in the illustrated locked position of the locking slide 16 at a distance to a front face 30 of the square-shaped flat slide section 24. In the illustration of FIG. 2 the guide groove 26 is confined at the top by an upper horizontal face 32 running at right angle to a front face section 34 of the front edge 8. A corresponding front face section 36 of the other panel 4 is in contact with the front face section 34 of the other panel 2 in the direction of the effective face 38 of the floor covering 1, wherein this contact need not necessarily be effected with press fit, but a certain clearance may also be tolerated.

A—in FIG. 1—lower part of the front face section 36 is recessed relative to the adjacent front face section 34.

A—in FIG. 2—lower horizontal face 40 of the guide groove 26 is extended beyond the plane of the front face sections 34, 36 to the right (illustration in FIG. 2), so that the flat slide section 24 is supported downwardly across a comparatively large area. In the illustrated embodiment the flat slide section 24 is provided with nubs 42 which reduce slide friction and improve sliding fit. It is, however, definitely also possible to renounce these elements and to guide the flat slide section 24 to slide flush along the horizontal faces 32 and 40.

The lower horizontal face 40 extends up to a vertical face 44 of the panel 2. From there, the groove underlip 22 extends, at the end section of which the horizontal locking projection 20 is formed. It has an inclined horizontal locking surface 46 being in contact with a rear-side beveled face 48 of the shearing block 18 in the locked position, wherein the two faces 46, 48 extend in parallel.

The rear-side beveled face 48 of the shearing block 18 is confined by a recess 50 on the bottom side of the panel 4 into which the horizontal locking projection 20 immerses. The type of horizontal lock via a shearing block 18 resting on a groove underlip 22 and being engaged behind by a locking projection 20 has also been implemented in prior art already, so that further explanations in this respect are superfluous.

The somewhat recessed portion of the front face section 36 of the panel 4 is followed by a locking recess 52 into which a locking projection 54 of the profiled slide 16 immerses in the illustrated locked position. This locking projection 54 has, in the illustration of FIG. 2, an approximately triangular profile extending in continuation of the flat slide section 24. The locking projection 54 is confined on the one side by an inclined guiding surface 56 which is inclined with respect to the horizontal (installation plane). In the illustrated embodiment this pitch angle is about 50°. The locking projection 54 is confined toward the right by a front face 58 extending at an acute angle to the guiding surface 56 and being arranged at a distance to a rear wall 60 of the locking recess 52 in the locked position. The front face 58 is followed by a support face 62 formed at the locking projection 54, said support face 62 extending approximately in parallel to the guiding surface 56 in the illustrated embodiment and contacting with an abutment wall 64 of the locking recess 52. This abutment wall 64 extends at a parallel distance to a locking surface 66 of the profiled slide 16 which the guiding surface 56 is in contact with. The locking surface 66 and the abutment wall 64 of the locking recess 52 thus also extend approximately in parallel to each other. In accordance with the illustration in FIG. 2 the distance between the front wall 58 and the rear wall 60 of the locking recess 52 increases toward the abutment wall 64. In the section according to FIG. 2 a vertical face 68 extends in continuation of the inclined abutment wall 64, which is then followed by an inclined face 70 of the shearing block 18.

The guiding surface 56 of the locking projection 54 transitions via a horizontal face 72 into the recessed portion of the front face section 36 of the panel 4. This horizontal portion 72 is distinctly spaced apart from the flat slide section 24 of the profiled slide 16.

The illustration of FIG. 2 reveals that the front-end horizontal locking between the two panels 2, 4 is substantially performed by the locking recess 20 engaging behind the shearing block 18 and by the contact of the front face sections 34, 36. The vertical locking is, on the one hand, performed by the resting of a floor face 74 of the shearing block 18 on the groove underlip 22 and, on the other hand, by the support of the locking projection 54 of the profiled slide 16 on the abutment wall 64 and the locking surface 66. The forces introduced into the profiled slide 16 by the panel 4 are then introduced into the panel 2 via the flat slide section 24, so that the two panels 2, 4 are correspondingly also fixed in position in the vertical direction.

By means of FIGS. 3a to 3d the front-end locking of the two panels 2, 4 will be explained. It is assumed that the long side of the panel 6 has already been connected with the panel 2 and that the panel 4 is to be installed now. For this purpose, its long side is connected with the panel 6 that has already been installed, wherein the two front edges 8, 10 of the panels 2, 4 are aligned with each other. As mentioned, the connection of the long sides is performed by the longitudinal edge of the panel 4 being positioned angularly to the corresponding longitudinal edge of the panel 6. Subsequently, the panel 4 is angled from its angular position to the horizontal, wherein the front-end connection is performed during angling. During the angling of the panel 4, the locking surface 66 of the panel 4 first of all runs on the inclined guiding surface 56 of the profiled slide 16. In accordance with the illustration in FIG. 3a, in its delivery condition the front face 30 of the profiled slide 16 is in contact with the groove ground 28 of the guide groove 26. By the horizontal force component resulting from the running of the locking surface 66 on the guiding surface 56, the profiled slide 16 is moved from its basic position illustrated in FIG. 3a to the right (arrow in FIG. 3b), wherein the guiding surface 56 slides off on the locking surface 66 and hence the locking projection 54 immerses into the locking recess 52.

During the further angling of the panel 4, the support face 62 then gets into contact with the abutment wall 64, wherein the beveled face 48 of the shearing block approaches the horizontal locking surface 46 of the groove underlip 22. During the further lowering process of the panel 4, the locked position illustrated in FIG. 2 and explained already in detail will be reached. The profiled slide 16 is thus automatically moved from the release position illustrated in FIG. 3a to the locked position illustrated in FIG. 2 in which the guiding surface 56 and the support face 62 of the profiled slide 16 are in contact with the correspondingly inclined locking surface 66 or the abutment wall 64, respectively.

In the illustrated embodiment the faces 56 and 62 or 66 and 64, respectively, are positioned in parallel to each other—on principle, however, this parallel arrangement or a planar contact of the areas 56, 66 and/or 62, 64 is not required, though.

Figure 3A:
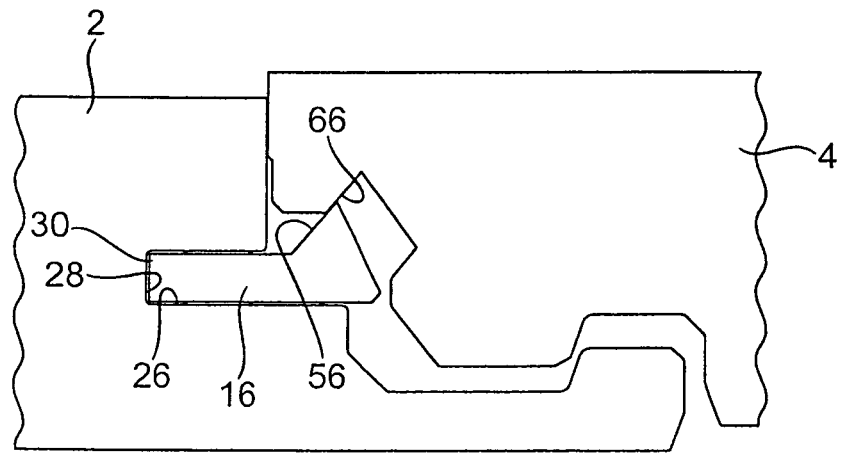
Figure 3B:
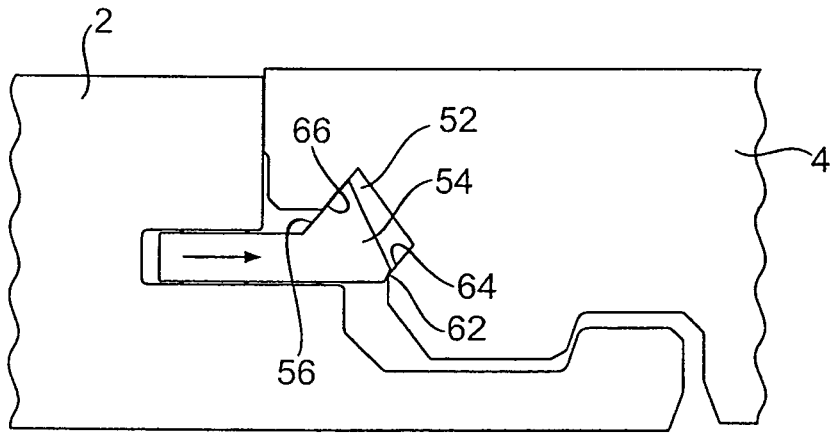
Figure 3C:
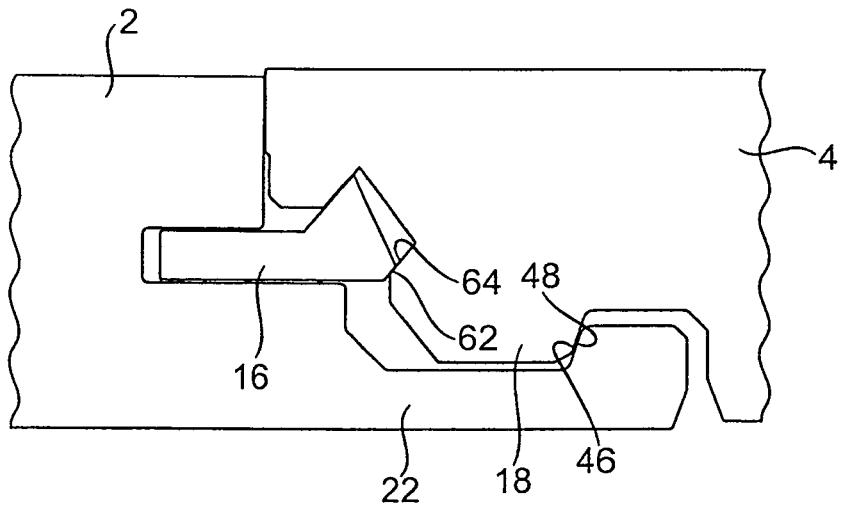

As explained by means of FIG. 3d, the exact prior positioning of the profiled slide 16 is not cogently necessary. FIG. 3d illustrates the case that the profiled slide, prior to performing the front-end locking, was moved somewhat to the right from its release position. In this case, during angling of the panel 4 first of all the beveled face 70 of the shearing block 18 runs on the front face 58 of the profiled slide 16, such that it is, due to the resulting horizontal force component, first of all moved to the left (arrow in FIG. 3d) into the guide groove 26. During further angling, as illustrated in FIG. 3a, the locking surface 66 then runs on the guiding surface 56, so that the profiled slide 16 is then again moved to the right, in the direction of its locked position. This means that the concept according to the invention is relatively insensitive with respect to an exact prior positioning of the profiled slide 16, so that even if the profiled section 16 is not positioned exactly, the front-end connection can be established without additional effort since the profiled slide so to speak adjusts itself.

The embodiment illustrated in FIG. 2 was included for the purpose of a better understanding of the invention, but it does not show the horizontal lock incorporated in the profiled slide which will be explained in the following. This transverse elasticity is explained in detail in the parallel patent application, so that, with reference to these explanations which count among the disclosure of the instant patent application, a repetition of the statements is renounced.

In the afore-described embodiments, locking in the horizontal direction is performed through the shearing block 18 which is engaged behind by the horizontal locking projection 20 and thus substantially determines the horizontal withdrawal forces. The milling of the profiling of the shearing block 18 and of the horizontal locking projection 20 requires substantial effort, wherein the material consumption is also high due to the great length of the groove underlip 22.

By means of FIGS. 4 to 6 that are explained in the following, embodiments are explained in which such a horizontal lock may be renounced and this lock is transferred to the region of the profiled slide 16.

FIGS. 4a to 4c illustrate in a strongly schematic manner a first embodiment of a connection with integrated horizontal lock. The profiled slide 16 is mounted in a movable manner in the panel 4 to be angled and immerses, pursuant to FIG. 4a, with its locking projection into the locking recess 52 of the other panel 2, wherein the guiding surface 56 and the support face 62 are then in planar or linear contact with the locking surface 66 and/or the abutment wall 64. In the embodiment pursuant to FIG. 4, the latter is designed as a planar face. In accordance with FIG. 4a, the lower lip, also called groove underlip 22 for the sake of simplicity, is designed without the horizontal locking projection 20 of the afore-described embodiments. This means that a lower side 104 of the region confining the guide groove 26, here also referred to as shearing block 18, rests in a planar manner on the upper side 106 of the groove underlip 22, so that the panel 4 is supported on the panel 2—a horizontal lock in this region does, however, not exist or exists to a comparatively small degree only.

This horizontal lock is performed inter alia via a tongue 108 that is either designed integrally with the profiled slide 16 or is hinged thereon as an additional component. This tongue 108 immerses into a shifting recess 110 of the panel 4 (see FIGS. 4a, 4c) and is with a front side 112 in contact with an abutment wall 114 in the locked position, so that the panel 2 is locked in the horizontal direction with respect to the panel 4.

FIG. 4b illustrates the panel 4 with the profiled slide 16 in the locked position in which the front side 112 is in contact with the abutment wall 114, wherein a part of the tongue 108 which projects from a large area 116 immerses to be flush with the recess 110.

FIG. 4c illustrates the panel 4 in the release position prior to the lowering process on the panel 2 that has already been installed. As explained before, in this release position the profiled slide 16 is fully or largely pushed into the guide groove 26, wherein the locking projection 54 is substantially covered by the region of the panel 4 which is confined by the front face section 36. The tongue 108 immerses into the shifting recess 110 with a small end section only, so that the front side 112 and the abutment wall 114 are spaced apart. During the lowering process, the guiding surface 56 then runs on the locking surface 66, so that the profiled slide 16 is moved out of the guide groove 26 in the locking direction in the afore-described manner, wherein the tongue 208 immerses with its projecting end section into the shifting recess 110 until it runs on the abutment wall 114 with its front face 112 (FIG. 4b). In the locked position the support face 62 is then in contact with the abutment wall 54 as described before.

As explained, the tongue 108 may be designed to be elastically deflectable on the profiled slide 16. On principle it is, however, possible to mount the tongue 108 as a pivotable element or the like on the profiled slide 16.

FIG. 5 illustrates a variant of the embodiment pursuant to FIGS. 4a to 4c. In the last-mentioned embodiment the abutment wall 64 is designed as a face inclined relative to the horizontal. FIG. 5 illustrates a variant in which the abutment wall 64 is designed as a horizontal face (parallel to the installation plane). A support finger 118 that will be explained in more detail in the following is formed on the profiled slide 16, said support finger 118, in the illustration pursuant to FIG. 5, projecting beyond the locking projection 54 to the right toward the other panel 2 and being with a support face section 120 in contact with the horizontally extending abutment wall 64. Correspondingly, the profiled slide 16 is, with a part of the large area 116, in contact with the abutment wall 64, so that the afore-described support face 62 is formed by face sections of the large area 116 and of the support face section 120 of the support finger 118. In contrast to the afore-described embodiments, the beveled front face 58 does not extend across the entire height of the profiled slide 16, but ends in a vertically (perpendicular to the installation plane) extending front edge 122. The area of the support finger 118 which is covered by the locking projection 54 is shown dashed in the illustration of FIG. 5.

In this embodiment, the tongue 108 is mounted to be swiveled around a swivel joint 124 on the profiled slide 16. Such a variant is also illustrated in the embodiment pursuant to FIGS. 4a to 4c.

FIGS. 6a to 6d illustrate different views of a profiled slide 16 as may be used in the embodiments pursuant to FIGS. 4 and 5. FIG. 6a illustrates a three-dimensional top view of the profiled slide 16. One recognizes the flat slide section 24 and the locking projection 54 projecting downward. A plurality of tongues 108 which are angled obliquely upward from the large area 116 have been cut clear from the profiled slide 16. The clear cut of these tongues 108 produces slots 126 which award the afore-described elasticity in the longitudinal axis to the profiled slide 16, so that angling is facilitated. In the illustrated embodiment the clear cut is chosen such that a support finger 118 is furthermore assigned to each tongue 108, said support finger 118 being obliquely angled in the plane of the large area 116 and thus extending toward the other panel 2 in the installation position (see FIG. 5). This inclination of the support finger 118 is caused by a key seat 128 tapering in the direction of the locking projection 54.

Such a profiled slide 16 may, for instance, be manufactured by a stamping and bending process from metal or else from a plastic material in an injection molding process.

FIG. 6b illustrates a bottom view of the profiled slide 16 of FIG. 16a. One recognizes the locking projections 54 projecting from the flat slide section 24 downward, and the tongues 108 designed in the region of the flat slide section 24 and inclined thereto, which are angled upward. The afore-described support fingers 118, which are illustrated schematically in FIG. 6b, extend away from the respective locking projections 54. They are bent out of the plane predetermined by the front edge 122, so that the support face section 120 (see FIG. 6a) immerses into the locking recess 52 (see FIG. 5) and may get into contact with the abutment wall 64.

FIG. 6c illustrates a top view pursuant to FIG. 6a on the profiled slide 16. One clearly recognizes the angled support fingers 118 which are angled out of the plane predetermined by the front edges 122, and the correspondingly opening key seat 128. The tongues 108 are angled out of the drawing plane toward the viewer.

FIG. 6d illustrates a side view of the profiled slide 16. In this view one recognizes the part of the support finger 118 which projects over the front edges 122 and which is with the front face section 120 in contact with the abutment wall 64. The part of the tongue 108 which is bent out and the locking projection 54 projecting downward can also be seen.

The embodiments of the profiled slides 16 explained by means of the embodiments pursuant to FIGS. 4, 5 and 6 have a double function. On the one hand, a vertical lock is performed via the profiled slide 16 by automatic movement without substantial elastic deformation. On the other hand, a horizontal lock is performed via the tongues 108, so that the withdrawal forces required for separating the panels 2, 4 are substantial.

In the embodiments pursuant to FIGS. 4, 5 and 6 no continuous locking projection 54 is provided, but a plurality of locking projections 54 that are spaced apart from each other.

FIG. 7 illustrates a section of a further embodiment in which the profiled slide 16 is guided in the panel 4 to be installed. In these variants the profiled slide 16 is guided such that its locking projection 54 is oriented downward to the panel 2 that has already been installed and on which the locking recess 52 is formed. In the variant illustrated in FIG. 7, the flat slide section 24 has, similar as in the embodiment of FIG. 6, a plurality of tongues 108 extending upward to the effective surface and cut clear from the flat slide section 24.

The tongue 108 immerses into the shifting recess 110 along which the end section of the tongue 108 is then movable during the movement from the release position into the illustrated locked position. In the release position the tongue 108 may get with its inclined rear face 130 into contact with a corresponding face 132 of the shifting recess 110. In the illustrated locked position the—in this embodiment—vertical front side 112 is in contact with the correspondingly orientated abutment wall 114 of the shifting recess 110.

The support finger 118 projects, like in the afore-described embodiment, from the front face 58 of the locking projection 54 toward the component 2 that has already been installed. In the embodiment pursuant to FIG. 7, a groove 134 is formed in the abutment wall 64 of the locking recess 52 into which the support finger 118 immerses in the locked position, wherein its support face section 120 is supported on a groove face 136. In the illustrated embodiment the groove face 136 is designed to be somewhat inclined relative to the approximately horizontally extending support face section 120, so that an additional vertical lock of the two panels 4, 2 is performed. The horizontal lock is substantially performed by the tongue 108 that is in contact with the approximately vertically extending contact face of the shifting nut 110, in cooperation with the locking projection 54 whose guiding surface 56 is in contact with the locking surface 66. The vertical orientation of the abutment wall 114 and of the front side 112 ensures high withdrawal strength via the tongue 108 which prevents a movement of the panel 2 to the right in FIG. 7 away from the panel 4.

In order to increase this withdrawal force even more, an additional horizontal lock is provided in the embodiment illustrated in FIG. 7. In the region in which a shearing block is provided in the embodiments described in the parallel patent application, a rib 140 projects which immerses into a V-shaped cut 138 on the upper side 106 of the so-called groove underlip 22. The rib 140 has an inclined beveled face 48 which is in contact with a correspondingly inclined horizontal locking face 46. Due to the inclination of these two faces 44, 46 the rib 140 can, however, not fulfil the locking function which the shearing block 18 has in the embodiments described in the parallel patent application. As explained above, the substantial horizontal lock is performed via the tongue 108 and the locking projection 54. The vertical lock is performed by the lower side 104 of the panel 2 which is supported on the groove underlip 22, by the support finger 118 which is in contact with the groove face 136, and by the face sections 62, 64, on the one hand, and 66, 56, on the other hand.

Figure 8A:
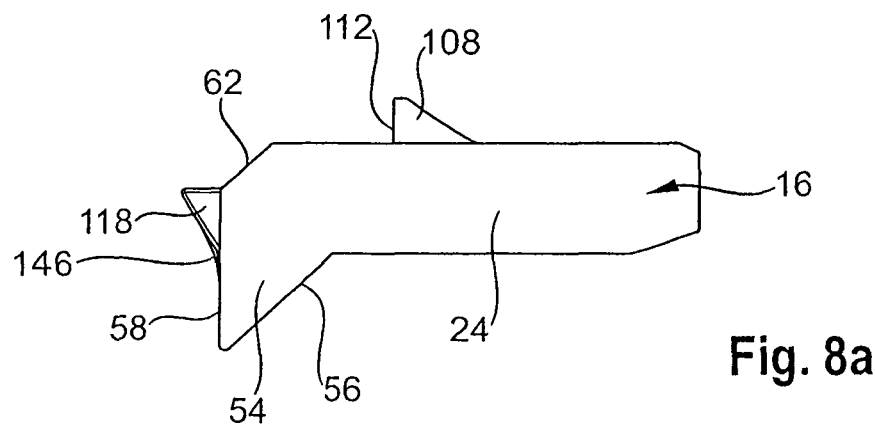

The structure of the profiled slide 16 is explained by means of FIGS. 8a to 8e. FIG. 8a shows the profiled slide 16 in the same view as in FIG. 7. One recognizes the flat slide section 24 and the locking projection 54 as well as the upwardly projecting tongue 108 with its vertically extending front side 112. The support finger 118 projects to the left from the approximately vertically extending front face 58 and has an approximately triangular profile in the illustrated view.

Figure 8B:
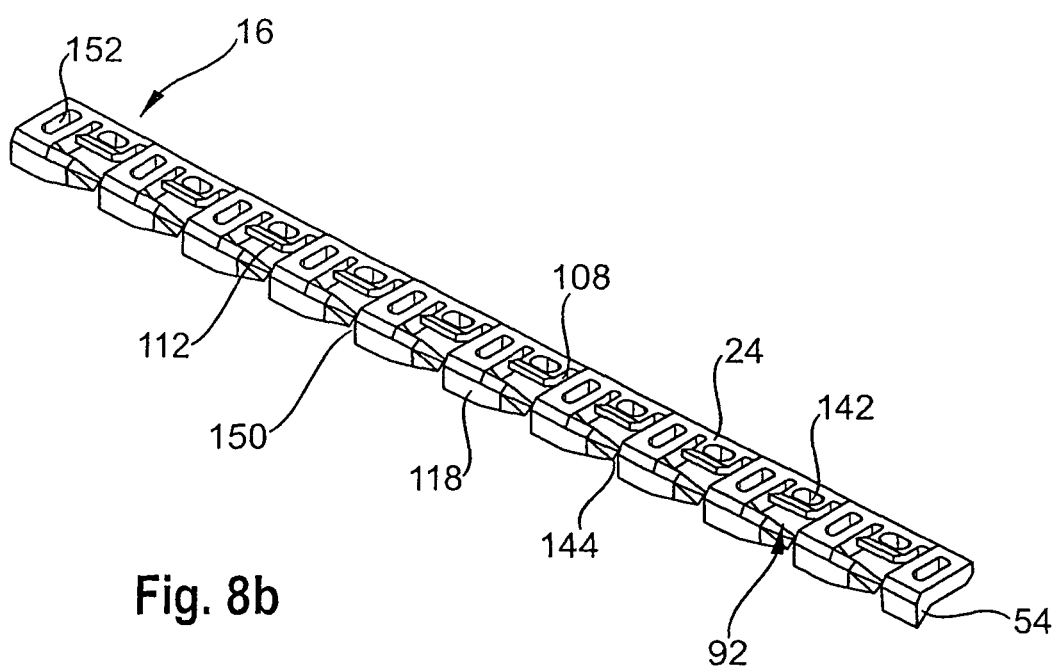

FIG. 8b shows the profiled slide 16 in a three-dimensional illustration. One recognizes the tongue 108 curving out upwardly from the flat slide section 24 and the support fingers 118 extending laterally from the front face plane of the locking projection 54. The concrete structure becomes clearer when looking at FIGS. 8c to 8d, wherein FIG. 8d shows a view from the left on the profiled slide 16 in FIG. 8a while FIG. 8e shows a top view and FIG. 8c a bottom view.

As results in particular form FIGS. 8c and 8e, each tongue 108 is formed by a clear cut 92 having an approximately U-shaped design in the top view and/or the bottom view and encompassing the tongue 108, wherein a basis 98 of the U-shaped clear cut 92 forms the vertically (perpendicular to the drawing plane in FIG. 8e) extending front side 112 of the tongue 108 curving out toward the viewer in this illustration. The two lateral legs 94, 96 of the clear cut 92 confine the tongue 108 laterally. For improving the elasticity of the tongue 108, it is provided with a breakthrough 142.

The—in the illustrations right—leg 94 of the clear cut 92 is extended relative to the other leg 96 and penetrates the locking projection 54, so that the support finger 118 is formed which is confined toward the tongue 108 by the basis 98 and on the front side by the leg 94 of the clear cut 92 which opens downward in the illustration pursuant to FIG. 8e. The support finger 118 is laterally bound to the remaining part of the locking projection 54 and has—in the illustration pursuant to FIGS. 8c and 8e—an approximately triangular, laterally projecting supporting cam 144 contributing to the vertical support of the panel 4 that has already been installed. In accordance with the side view in FIG. 8d, the support finger 118 is tapered relative to the remaining locking projection section 54 by a vertical tapering 146 toward the supporting cam 144. Correspondingly, an approximately triangular reinforcement 148 (see FIG. 8c) is provided in the binding region to the respective locking projection section 54, so that relatively large support forces may be applied via the solid support finger 118. In the illustration pursuant to FIG. 8d one recognizes the upwardly projecting end sections of the tongue 108 and their vertically extending (parallel to the drawing plane in FIG. 8d) front side 112. In this illustration the mouth region 150 of the leg 94 of the clear cut 92 is also shown. In the side view pursuant to FIG. 8d one also recognizes clearly that the upper face 152 of the support finger 118 also declines toward the supporting cam 144, so that the support finger 118 tapers toward its end section.

A further advantage is achieved by this design of the leg 94 of the clear cut 92 which opens toward the front face on the locking projection side. During the angling process of the panel 4 that has already been connected with its long side, it is first of all positioned angularly to the panel 2 that has already been installed, so that during this angling process and the involved shifting movement of the profiled slide 16 the support face 62 does not get into contact with the abutment wall 64 along its total length, but increasingly in the course of the angling process of the panel 4. Pilot tests have shown that this angling movement and a rigid design of the profiled slide 16 may cause "squeezing" in the region in which—depending on the stage of angling—the support face 62 runs into the abutment wall 64. In order to avoid this "squeezing", the construction of the profiled slide 16 has been chosen such that it can be deflected in the direction of the installation plane, so that the afore-described running of the support face 62 into the abutment wall 64 is facilitated since the profiled slide 16 yields, wherein this elastic connection then propagates in the horizontal plane as a function of the stage of angling in the longitudinal direction through the profiled slide 16 until it has achieved its locked position (the panel 4 is completely angled). It thus performs an approximately "meandering" movement. For the sake of illustration, such a connection region is indicated in FIG. 8c with a chain dotted line during the angling process, wherein this deflection is only some hundredths or tenths of a millimeter—the illustration in FIG. 8c is exaggerated. Further details can be found in the parallel patent application. This transverse elasticity is enabled in the illustrated embodiment by the clear cuts 92 with the legs 94 opening toward the front face. In the embodiment pursuant to FIGS. 6a to 6d this desired transverse elasticity of the profiled slide 16 is implemented by the slots 126 in the flat flat slide section 24 and in the region of the locking projections. All the other profiled slides described in the instant application are also designed with the transverse elasticity for enabling the S-shaped "meandering movement".

For minimizing the weight, a plurality of oval holes 150 is also provided in the flat slide section 24.

By means of FIGS. 9 and 10 an embodiment will be explained in which the profiled slide 16 is again arranged in the panel 2 that has already been installed. Accordingly, the locking projection 54 faces toward the panel 4 to be installed. FIG. 9 illustrates the locked position in which the locking projection 54 immerses into the locking recess 52. The profiled slide 16 that will be explained in detail in the following has a similar structure as in the afore-described embodiment.

Also the profiled slide 16 illustrated in FIG. 9 has a tongue 108 immersing into a shifting recess 110 and being with the front side 112 in contact with the vertical abutment wall 114 of the shifting recess 110 in the locked position. During the shifting process from the release position into the illustrated locked position the flat slide section 24 is guided in the guide groove 26. In the locked position, as explained in detail before, the face regions 62, 64 of the locking projection 54 and/or the locking recess 62, on the one hand, and the face sections 56, 66, on the other hand, are in contact with each other so as to effect a horizontal lock. The tongue 108 extends, similar to the afore-described embodiment, in opposite direction to the locking projection 54. In the embodiment pursuant to FIG. 9 the profiled slide 16 is additionally provided with a flexible tongue 100 which immerses into a locking notch 102 on the component to be installed. As will be explained in detail in the following, the flexible tongue 100 projects from the guiding surface 56 of the locking projection 54. In the locked position the flexible tongue 100 engages behind a shoulder of the locking notch 102 so as to effect a horizontal lock. In this process, two face sections are in contact with each other, which have on principle the same function as the faces 46, 48 in the afore-described embodiment, so that corresponding reference numbers are used. In the variant pursuant to FIG. 9, however, the horizontal locking face 46 and the lock face 48 are designed as vertical faces—the horizontal lock is thus effected by a cooperation of the faces 46, 48 and 112, 114. An additional assist lock as in FIG. 7 in the region of the groove underlip 22 may be renounced. This one has, similar as in the initially described embodiments, merely a support function since the lower side 104 of the panel 104 rests on the upper side 106 of the groove underlip 22.

In all the embodiments described in the instant application the locking forces acting in the horizontal direction are substantially transferred over the profiled slide 16, wherein the latter in turn supports on the panels 2, 4 in the horizontal direction. These support regions are designated by way of example with reference numbers A, B in FIG. 9. It is preferred if the breadth A, B of these holding webs lies in the range between 1 mm and 4 mm, preferably in the range between 2.0 mm to 2.5 mm.

The breadth of the holding webs of the other embodiments is to be chosen appropriately.

In all the embodiments described a panel is supported on the so-called groove underlip (it has in fact no locking function). On principle, this vertical support on the groove underlip 22 may be renounced. In this case, however, care should be taken that the fit between the horizontal face 72 of the panel 4 and the corresponding horizontal face section 73 of the profiled slide 16 and the further, lower horizontal face section 75 as well as the adjacent support face section 76 of the other floor panel 2 are matched with each other such that the support forces can be transferred. This geometry with the suitable fit of the face sections 72, 73, 75 and 76 as mentioned may also be implemented in the other embodiments described in the instant application if the support on the lower "groove underlip" 22 is to be renounced.

Figure 10A:
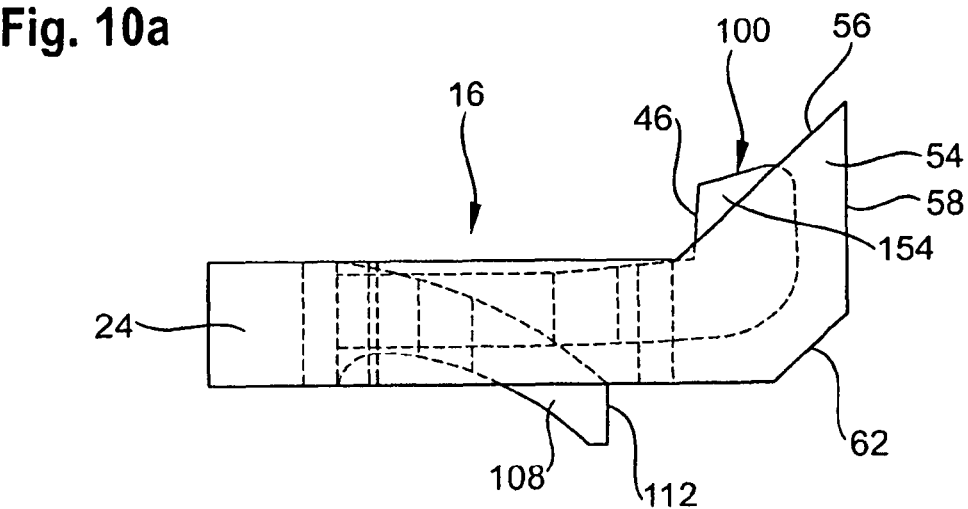
Figure 10B:
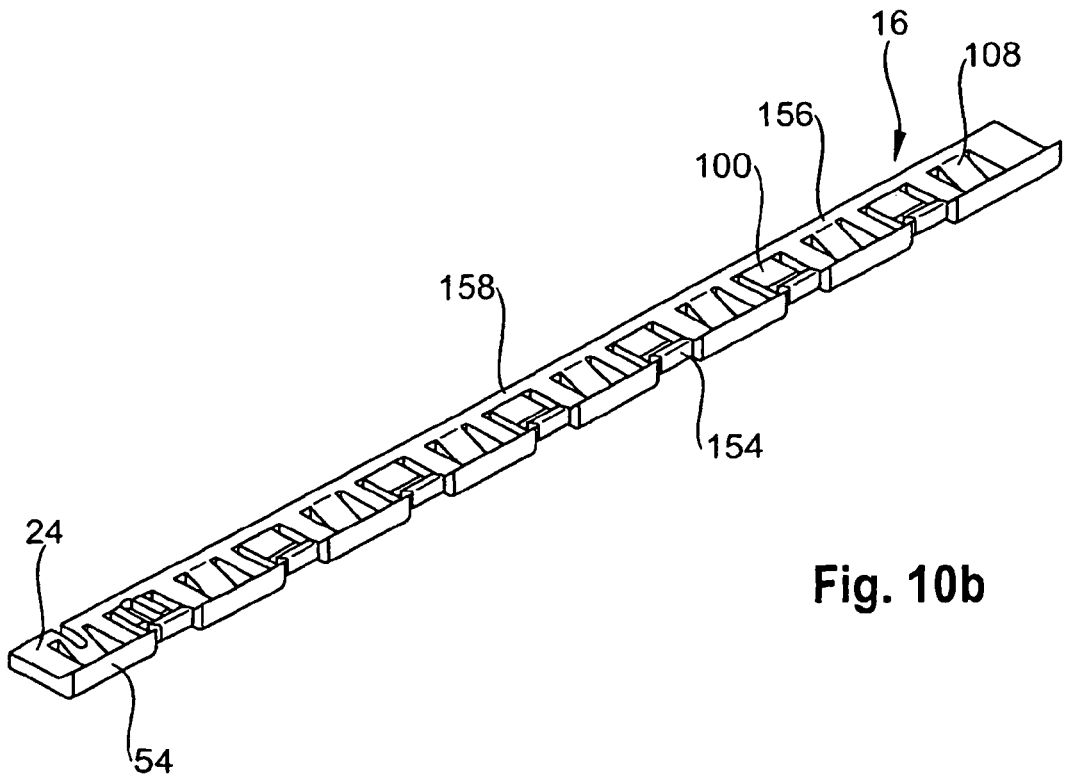

FIG. 10a shows an detailed illustration of the profiled slide 16 of FIG. 9, wherein, for ease of understanding, some invisible edges have been drawn. In this illustration one clearly recognizes the tongue 108 curved downward, with its vertically extending front side 112. The tongue 108 projects downward, away from the locking projection 54, from the flat slide section 24. The flexible tongue 100 is bound to the flat slide section 24 approximately in the same region as the tongue 108, but extends to the right beyond the latter and beyond the locking face 66 of the locking projection 54. In the illustration pursuant to FIG. 10a the flexible tongue 100 is approximately L-shaped, wherein the shorter L-leg forms the horizontal locking face 46 that is slightly inclined relative to the vertical. FIG. 10b illustrates a three-dimensional top view of the profiled slide 16. The tongues 108 curved downward and the flexible tongues 100 whose shorter L-legs project upward toward the viewer in FIG. 10b are clearly recognizable.

Figure 10C:
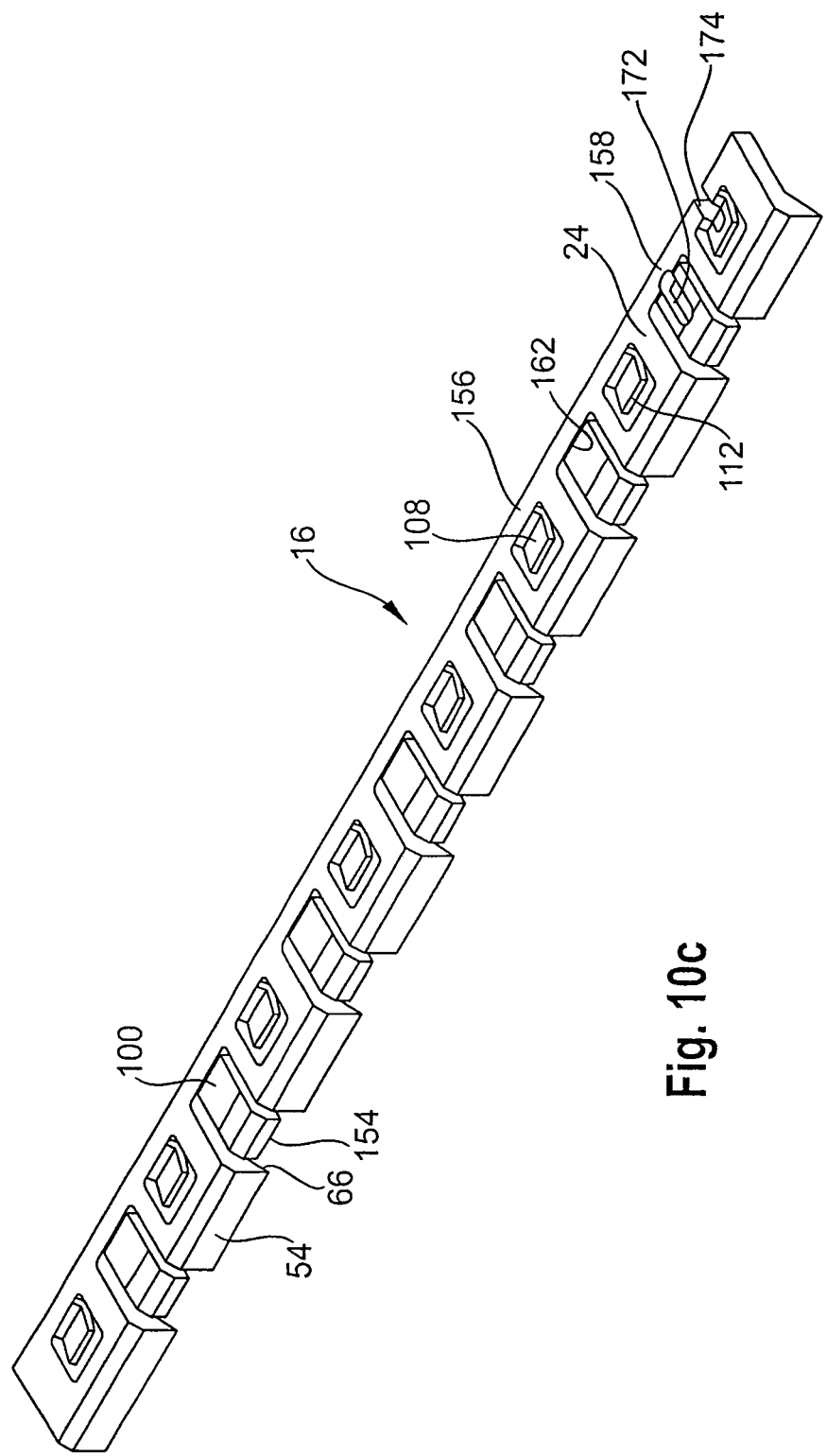

FIG. 10c illustrates a bottom view of the profiled slide 16. In this illustration the end sections of the tongues 108 are visible with their vertically extending front sides 112 which extend from the basis of the flat slide section 24 toward the viewer. The flexible tongues 100 are visible in FIG. 10c from the bottom, wherein the L-legs 154 extend away from the viewer and extend downward beyond the locking face 66 of the locking projections 54 formed in sections.

Figure 10D:
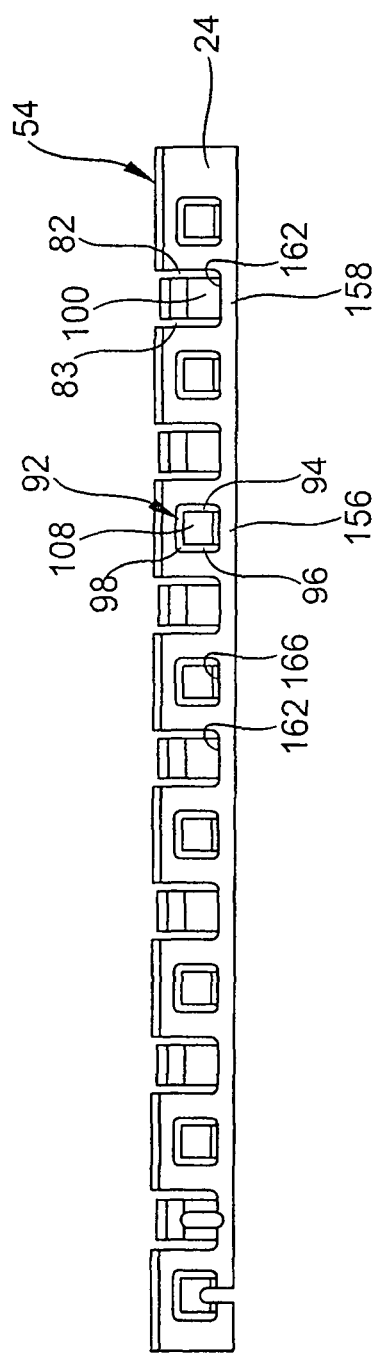
Figure 10E:
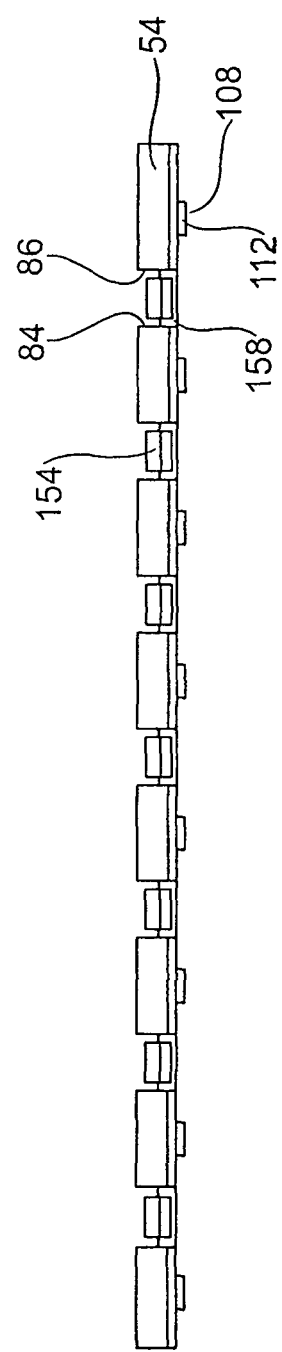
Figure 10F:
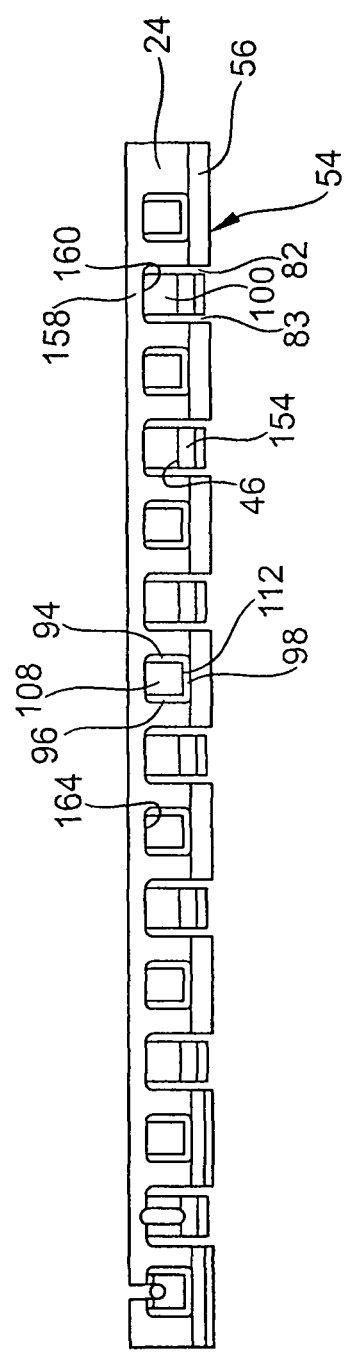

FIGS. 10d to 10f illustrate a bottom view (FIG. 10d), a side view (FIG. 10e) and a top view (FIG. 10f). In particular FIGS. 10d and 10f reveal that the tongues 108 are, similar as in the afore-described embodiment, formed by a U-shaped clear cut 92 whose basis 98 forms the end section of the tongue 108 with the front side 112, while the side faces of the tongue 108 are confined by the legs 94, 96 of the clear cut 92. The tongues 108 are each bound to the flat slide section 24 via a binding 156 (FIG. 10d).

The flexible tongues 100 are formed on both sides by continuous recesses 82, 83 opening toward the locking projection 54. Also these flexible tongues 100 are bound to the flat slide section 24 via a respective binding 158, wherein, however, the wall thickness of the flexible tongues 100 is somewhat smaller than that of the flat slide section 24, so that a step 160 (FIG. 10f) or 162 (FIG. 10d) originates in the transition region from the binding 158 to the flexible tongue 100 on both sides. Corresponding steps 164, 166 (FIGS. 10d, 10f) are also formed in the binding 156 of the tongues 108.

The afore-described L-leg 154 extends in the illustration of 10f toward the viewer and forms the horizontal locking face 46 extending substantially in the vertical direction.

The slots 82, 83 confining the flexible tongues 100 again produce the afore-described transverse elasticity which facilitates the locking process. For further improvement of the transverse elasticity and for reducing material aggregation during injection molding, further recesses 172 or slots 174—as indicated in FIG. 10c—may be formed on the profiled slide 16.

Pilot tests have shown that in particular with the last-described embodiment withdrawal forces can be implemented which lie in the range of conventional connections.

The material of the profiled slide may also be optimized with respect to these withdrawal forces, wherein fiber-reinforced plastics or metal profiles may be used for stabilizing the flexible elements (100, 108).

For the actual horizontal and vertical lock it plays a subordinate role whether the profiled slide 16 is guided in the panel 4 to be installed or in the panel 2 that has already been installed.

As already explained, "squeezing" may occur during the lowering process of the one panel 4 on the panel 2 that has already been installed if the profiled slide gets for the first time into contact with the respectively other panel. In order to enable the running in and hence the angling process without squeezing or to avoid another blocking, pursuant to FIG. 11 a bevel 168 may be formed laterally, this means on at least one of the end sections of the profiled slide 16, said bevel 168 extending in the region of a peak 170 between the—in the embodiment pursuant to FIG. 11—lower guiding surface 56 and the front face 58, and in which thus the inclined guiding surface 56 and the peak 170 end. This bevel 168 may also be formed on one end section of the profiled slide 16 only—in this case the bevel 68 would have to be formed on the end section which is the first to get into contact with the respectively other panel. Such a bevel in the run-in region may also be provided in all the other solutions described in the instant application or covered by the claims.

FIGS. 12 and 13 illustrate a further embodiment of a connection according to the invention which is based on the afore-described embodiment and in which the "squeezing" during installation is further reduced.

Similar as in the afore-described embodiment, the horizontal lock is performed via the flexible tongue 100 projecting from the locking projection 66 of the profiled slide 16 and the tongue 108 projecting downward from the flat slide section 24 in counter-direction. The tongue 108 is guided in the shifting recess 110 during the shifting process of the profiled slide 16 into its locked position. During the angling process the flexible tongue 100 immerses into the locking recess 52. A difference to the afore-described embodiment consists in that, in the locked position, the guiding surface 56 of the locking projection 66 is not in contact with a circumferential wall of the locking recess 52, but that this horizontal lock in withdrawal direction, i.e. in a direction in which the panel 4 moves to the right (FIG. 12) away from the panel 2, is also effected by a contact of the horizontal locking face 46 with the lock face 48 of the locking recess 52. In the illustrated embodiment these two faces 46, 48 are somewhat inclined relative to the vertical in FIG. 12.

As in the afore-described embodiments, however, during the angling process the panel 4 gets with an edge or a face section of the locking recess 52 into contact with the guiding surface 56, so that the profiled slide 24, due to the inclination of the guiding surface 56, is moved to the illustrated locked position in which the tongue 108 moves along the shifting recess 110. During the shifting process of the profiled slide 16 the flexible tongue 100 is, due to its elasticity, moved into the plane of the guiding surface 56 and then springs into the locking recess 52 in the locked position. The essential difference to the initially-described solutions consists in that the flexible tongue 100 contributes practically nothing to the vertical lock. In prior art, extra tongue noses are provided for vertical lock.

In the concrete solution pursuant to FIG. 12, the inclined guiding surface 56 slides off on a sliding edge 176 of the locking recess 52 during the angling process of the panel 4. The face 178 following the sliding edge 176 at the left in FIG. 12 is inclined somewhat relative to the horizontal in FIG. 12. In the transition region to the front face section 36 of the panel 4 a chamfer 180 is provided.

A further difference to the afore-described embodiments consists in that the flat slide section 24 is tapered by a notch face 182 in the transition region to the locking projection 54. This notch face 182 is at a small distance to the face 178 of the panel 4 in the locked position and is inclined relative to the horizontal, so that the guiding surface 56 and the notch face 182 form a V-shaped notch/groove in the profile pursuant to FIG. 12 by which the height (view pursuant to FIG. 12) of the flat slide section 24 is reduced.

In the afore-described embodiments a profile peak 184 confining the maximum height extension of the locking projection 54 is designed in vertical direction (perpendicular to the installation direction) higher than the corresponding peak face of the flexible tongue 100 (this relates only to embodiments in which the profiled slide 16 is arranged in the panel 2 that has already been installed). In the embodiment pursuant to FIG. 12 the profile peak 184 is approximately in the same plane as a confining face 186 of the flexible tongue 100. This plane, i.e. the faces 184, 186, is spaced apart from the adjacent circumferential wall of the locking recess 52. It is accordingly designed to be flatter, so that the part of the panel positioned thereabove in FIG. 12 may be designed with greater wall thickness.

As in the afore-described embodiments, the support face 62 is in contact with the abutment wall 64 in the locked position, so that the panel is fixed in position in the vertical direction by the faces 62, 64, on the one hand, and by the contact of the guiding surface 56 with the sliding edge 76, on the other hand. In the vertical direction the panel 4 is further supported by the resting of the lower side 104 on the upper side 106 of the lip 22. In the embodiment illustrated in FIG. 12, the side face of the entire profiled slide 16 is designed with a chamfer 188 which thus also forms the bevel in the region of the locking projection 54 as explained by means of FIG. 11. Furthermore, in the embodiment pursuant to FIG. 12 the flat slide front face 190 positioned at the left and the groove bottom 28 of the guide groove 26 are curved. Moreover, the illustrated embodiment corresponds to the afore-described embodiments both in function and in the basic structure, so that further explanations are superfluous.

FIG. 13*a* shows the profiled slide 24 of FIG. 12 in a three-dimensional detailed illustration. One recognizes the locking projection 54 which is concretely formed by a plurality of locking projection sections 54', wherein respective flexible tongues 100 are formed between adjacent sections 54' which are cut clear by the recesses 82, 83 (see FIG. 13*c*). FIG. 13*c* illustrates a top view of the profiled slide 24. FIG. 13*b* illustrates a bottom view of the profiled slide 24 illustrated in FIG. 13*c*. FIG. 13*d* illustrates correspondingly a top view of the profiled slide 24 in the illustration pursuant to FIG. 13*c*. In the views pursuant to FIGS. 13*b* and 13*d* one recognizes particularly clearly that the peaks of the locking projection sections 54' and of the flexible tongues 100 are in the same plane and extend across the flat slide section 24. The tongues 108 extend in counter-direction from the flat slide sections 24 and are, pursuant to FIGS. 13*a*, 13*c*, cut clear by the U-shaped clear cut 92 explained already by means of FIG. 10 (see FIG. 13*a*). In the illustrations pursuant to FIGS. 13*a*, 13*c* it is also clearly recognizable that the flexible tongues 100 are somewhat recessed relative to the locking projection sections 54'—in other words, the locking projection sections 54' extend beyond the flexible tongues 100 in the direction of breadth (shifting direction of the profiled slide 16). As explained by means of the embodiment pursuant to FIG. 10, the further recesses 174 and the slots 176 are formed to increase the transverse elasticity and to avoid material aggregation. In order to further minimize material, recesses 192, 194 (see FIGS. 13c, 13a) are also formed in the region of the locking projection sections 54' in the embodiment pursuant to FIG. 13.

In order to avoid a so-called "overshot", i.e. a vertical displacement of the panels 2, 4, a step 196 may be formed pursuant to the illustration in FIG. 14 in the region of the front face sections 34, 36, so that a covering is effected in the horizontal direction, wherein a step contact face 198 is supported on a step support face 200 in the vertical direction, so that, for instance during the installation process of the panels 2, 4 on a soft basis/insulating layer, the panel 4 is supported on the other panel 2 in addition to the face regions 104, 106, and the production of overshots is reliably prevented or minimized.

As for the rest, the embodiment pursuant to FIG. 14 corresponds to the afore-described embodiment.

The connection according to the invention with the profiled slide adapted to be shifted by angling or positioning of a panel can be used with floor as well as with wall and ceiling panels or similar components. They may be manufactured of laminate, but also of wood, for instance as a parquet, or completely or partially of an elastic material, wherein in the latter case the whole component is elastic or may comprise a rigid core of wood, HDF/MDF or a composite material. As explained, this profiled slide 16 may be arranged in the panel to be angled or in the panel that has already been installed.

Disclosed is a connection for elastic or rigid components, in particular for floor panels, wherein a locking element is adapted to be brought into a locked position by lowering a component relative to a component that has already been installed. The locking element effects a horizontal and vertical lock. It may be guided in the component that has already been installed or in the component to be installed.

LIST OF REFERENCE NUMBERS

1 Floor covering
2 panel
4 panel
6 panel
8 front edge
10 front edge
12 longitudinal edge
14 longitudinal edge
16 profiled slide
18 shearing block
20 horizontal locking projection
22 groove underlip
24 flat slide section
26 guide groove
28 groove bottom
30 front face
32 upper horizontal face
34 front face section
36 front face section
38 effective face
40 lower horizontal face
42 nub
44 vertical face
46 horizontal locking surface
48 lock face
50 recess
52 locking recess
54 locking projection
56 guiding surface
58 front face
60 rear wall
62 support face
64 abutment wall
66 locking surface
68 vertical face
70 beveled face
72 horizontal face
73 horizontal face section
74 floor face
75 horizontal face section
76 support face section
82 recess
83 recess
92 clear cut
94 leg
96 leg
98 basis
100 flexible tongue
102 locking notch
104 lower side
106 upper side
108 tongue
110 shifting recess
112 front side
114 abutment wall
116 large area
118 support finger
120 support face section
122 front edge
124 swivel joint
126 slot
128 key seat
130 rear face
132 face
134 groove
136 groove face
138 cut
140 rib
142 breakthrough
144 supporting cam
146 vertical tapering
148 reinforcement
150 mouth region
152 upper face
153 L-leg
156 binding
158 binding
160 step
162 step
164 step
166 step
168 bevel
170 peak
172 further recess
174 further slot
176 sliding edge
178 face
180 chamfer
182 notch face
184 profile peak
186 face
188 chamfer
190 flat slide front face
192 recess
194 recess
196 step
198 step contact face
200 step support face

The invention claimed is:

1. A connection of elastic or of rigid, panel components comprising:
    a lock which acts along adjacent lateral edges of the components and which can be brought into engagement by lowering one of the components relative to a another of the components that has already been installed, wherein:
    a locking element is arranged on a first one of the components, said locking element being adapted to be brought into locking engagement with a locking recess on a second one of the components for providing a vertical lock,
    the locking element is provided with functional elements, via which the components are substantially horizontally and vertically locked,
    the locking element is a profiled slide which has a locking projection with a guiding surface which is arranged angularly with respect to an installation plane and which comes into contact with a locking surface or another circumferential section of the locking recess during a connecting process,
    said guiding surface and said locking surface are configured to apply a force component to the profiled slide that causes a movement from a release position into a locked position such that said profiled slide is directly moved in a locking direction, and
    tongues with reverse effective surfaces are formed in a region of a flat slide section of the profiled slide or of the locking projection, said tongues projecting (i) from a plane of the flat slide section or a plane of the locking projection plane or (ii) from said flat slide section plane and the locking projection plane.

2. The connection according to claim 1, wherein the profiled slide is arranged in the component that has been installed or the component that is to be lowered.

3. The connection according to claim 1, wherein the guiding surface engages behind (i) the locking surface or (ii) another circumferential section of the locking recess in the locked position, and wherein the locking projection comprises a support face that is, at least in sections, in contact with an abutment wall of the locking recess in the locked position.

4. The connection according to claim 1, wherein the tongues are cut free by slot-shaped or U-shaped sections.

5. The connection according to claim 1, wherein a support face is formed in sections by a tongue curved out toward the second one of the components, said tongue extending in a direction away from the locking projection and being adapted to be brought into contact with an abutment wall.

6. The connection according to claim 5, wherein the abutment wall is a front face of a groove on the same component.

7. The connection according to claim 6, wherein the groove is a shifting recess along which an end section of the tongue is movable during the movement from the release position into the locked position.

8. The connection according to claim 5, wherein the tongue extends from a side of the profiled slide which is spaced apart from the locking projection.

9. The connection according to claim 5, wherein the locking projection has an essentially triangular shape, with the guiding surface formed at a rear and a front face facing the locking recess which is spaced apart from a rear wall of the locking recess in the locked position.

10. The connection according to claim 5, wherein the flat slide section is arranged in a guiding groove of the first one of the components.

11. The connection according to claim 10, wherein the profiled slide has a plurality of recesses or slots increasing a transverse elasticity of the profiled slide, wherein the recesses or slots end (i) in the flat slide section or (ii) in the region of the locking projection and are arranged approximately transversely to a longitudinal axis of the profiled slide.

12. The connection according to claim 10, further comprising a support finger extending laterally away from the locking projection.

13. The connection according to claim 12, wherein the support finger is cut free from the profiled slide.

14. The connection according to claim 13, wherein both the tongue and the support finger are formed by a free punch.

15. The connection according to claim 13, further comprising an additional flexible tongue extending in a direction of the locking projection and having a horizontal locking face formed thereon which engages behind a lock face on the second one of the components in the locked position.

16. The connection according to claim 15, wherein the lock face is inclined in a vertical direction with respect to the locking surface of the locking recess.

17. The connection according to claim 15, wherein the lock face is formed on a notch of the locking recess.

18. The connection according to claim 17, wherein the notch is formed in the locking surface.

19. A profiled slide for a connection according to claim 17, the profiled slide comprising the flat slide section on which the locking projection is formed and which comprises at least one of the tongues adapted to be brought with a front side into contact with a wall of the component in which the profiled slide is arranged for providing a horizontal lock.

20. The profiled slide according to claim 19, wherein the tongue is formed by a free cut.

21. The profiled slide according to claim 20, wherein the free cut is designed to be slot-shaped or U-shaped.

22. The profiled slide according to claim 19, further comprising a support finger extending away from the locking projection.

23. The profiled slide according to claim 22, wherein the support finger is confined at least partially by the free cut.

24. The profiled slide according to claim 19, further comprising an additional flexible tongue extending approximately in the direction of the locking projection and having a horizontal locking face formed thereon.

25. The profiled slide according to claim 24, wherein the flexible tongue projects from the locking projection.

26. The profiled slide according to claim 19, wherein a chamfered bevel is formed laterally on the locking projection in which (i) the guiding surface or a peak of the locking projection ends or (ii) said guiding surface and said peak ends.

27. The profiled slide according to claim 25, wherein the horizontal locking face is inclined relative to a vertical with respect to the guiding surface of the locking projection.

28. The profiled slide according to claim 19, wherein a flat slide section is formed in a transition region to the locking projection.

29. A floor covering with a connection and a profiled slide according to claim 1.

* * * * *